(12) United States Patent
Nakaji et al.

(10) Patent No.: US 7,255,946 B2
(45) Date of Patent: Aug. 14, 2007

(54) FUEL CELL POWER PLANT SYSTEM FOR MOVING BODIES AND CONTROL METHOD THEREOF

(75) Inventors: Yoshiharu Nakaji, Yokosuka (JP); Yasukazu Iwasaki, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 512 days.

(21) Appl. No.: 10/654,886

(22) Filed: Sep. 5, 2003

(65) Prior Publication Data

US 2004/0048118 A1 Mar. 11, 2004

(30) Foreign Application Priority Data

Sep. 6, 2002 (JP) ............... 2002-261347

(51) Int. Cl.
*H01M 8/04* (2006.01)
(52) U.S. Cl. .............. 429/13; 429/23; 429/24; 700/291
(58) Field of Classification Search ............... 429/9, 429/13, 22–24; 700/286, 291
See application file for complete search history.

(56) References Cited

U.S. PATENT DOCUMENTS

| | | | |
|---|---|---|---|
| 5,631,532 A | | 5/1997 | Azuma et al. |
| 5,983,154 A | * | 11/1999 | Morisawa ............... 701/56 |
| 6,173,226 B1 | * | 1/2001 | Yoshida et al. ............ 701/51 |
| 6,339,749 B1 | * | 1/2002 | Rieker et al. ............ 702/173 |
| 6,480,928 B2 | * | 11/2002 | Yashiki et al. ............ 711/103 |
| 6,577,334 B1 | * | 6/2003 | Kawai et al. ............. 348/148 |
| 6,847,127 B1 | * | 1/2005 | Lee ........................ 290/40 C |
| 6,876,892 B2 | * | 4/2005 | Matsuura et al. .......... 700/90 |
| 2002/0046889 A1 | * | 4/2002 | Kunitake et al. ......... 180/65.3 |
| 2004/0081870 A1 | * | 4/2004 | Miyazawa et al. ......... 429/24 |

FOREIGN PATENT DOCUMENTS

| | | | |
|---|---|---|---|
| JP | 2-174502 | | 7/1990 |
| JP | 10-271706 | | 10/1998 |
| JP | P2000-303836 A | | 10/2000 |
| JP | 2000329576 A | * | 11/2000 |
| JP | 2001-126748 | | 5/2001 |

(Continued)

OTHER PUBLICATIONS

Machine translation of JP 2001-307758 A.*

(Continued)

*Primary Examiner*—Gregg Cantelmo
(74) *Attorney, Agent, or Firm*—McDermott Will & Emery LLP

(57) ABSTRACT

A fuel cell power plant system for a moving body includes a drive device (2) for driving the moving body by receiving power,-a power plant (10) having a fuel cell (1) for supplying power to the drive device (2) and a fuel supply device (3) which supplies fuel required by the fuel cell (1) to generate power, and a controller (6). When the moving body has stopped, the controller (6) selects one operating mode from plural operating modes according to the running state of the power plant (10), the fuel cell (1) not generating power to be supplied to the drive device in the plural operating modes, and controls the power plant (10) based on the selected operating mode.

23 Claims, 21 Drawing Sheets

| | FOREIGN PATENT DOCUMENTS | | | JP | 2004-056868 | 2/2004 |
|---|---|---|---|---|---|---|
| JP | P2001-307758 A | 11/2001 | | | | |
| JP | 2001-338670 | 12/2001 | | | | |
| JP | 2001-359204 | 12/2001 | | | | |
| JP | 2002-141073 | 5/2002 | | | | |
| JP | 2002-170585 | 6/2002 | | | | |

OTHER PUBLICATIONS

European Search Report issued in corresponding European Patent Application No. 03017219.1-1227, dated Apr. 23, 2007.

* cited by examiner

| REFORMER TEMPERATURE T [°C] ||
|---|---|
| T<T0 | T≥T0 |
| HEAT GENERATION/ DISSIPATION BALANCE MODE | COMPLETE STOP MODE |

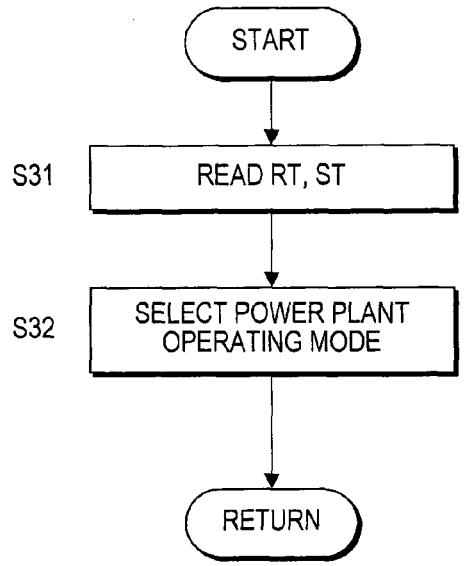

FIG. 7

| | | RUNNING TIME RT [min] | | |
|---|---|---|---|---|
| | | RT<10 | 10≤RT<15 | 15≤RT |
| STOPPING TIME ST [min] | ST<5 | HEAT GENERATION/ DISSIPATION BALANCE MODE | COMPLETE STOP MODE | COMPLETE STOP MODE |
| | 5≤ST<10 | HEAT GENERATION/ DISSIPATION BALANCE MODE | HEAT GENERATION/ DISSIPATION BALANCE MODE | COMPLETE STOP MODE |
| | 10≤ST | HEAT GENERATION/ DISSIPATION BALANCE MODE | HEAT GENERATION/ DISSIPATION BALANCE MODE | HEAT GENERATION/ DISSIPATION BALANCE MODE |

FIG. 8

| | | BATTERY SOC [%] | |
|---|---|---|---|
| | | SOC<SOC0 | SOC0≤SOC |
| REFORMER TEMP. T [°C] | T<T0 | POWER GENERATION/ CONSUMPTION BALANCE MODE | HEAT GENERATION/ DISSIPATION BALANCE MODE |
| | T0≤T | | COMPLETE STOP MODE |

|  |  | BATTERY SOC [%] | | | |
| --- | --- | --- | --- | --- | --- |
|  |  | SOC<SOC0 | SOC0≤SOC | | |
|  |  |  | RUNNING TIME RT [min] | | |
|  |  |  | RT<10 | 10≤RT<15 | 15≤RT |
| STOPPING TIME ST [min] | ST<5 | POWER GENERATION/ CONSUMPTION BALANCE MODE | HEAT GENERATION/ DISSIPATION BALANCE MODE | COMPLETE STOP MODE | COMPLETE STOP MODE |
|  | 5≤ST<10 |  | HEAT GENERATION/ DISSIPATION BALANCE MODE | HEAT GENERATION/ DISSIPATION BALANCE MODE | COMPLETE STOP MODE |
|  | 10≤ST |  | HEAT GENERATION/ DISSIPATION BALANCE MODE | HEAT GENERATION/ DISSIPATION BALANCE MODE | HEAT GENERATION/ DISSIPATION BALANCE MODE |

*FIG. 14*

| | | BATTERY SOC [%] | |
|---|---|---|---|
| | | SOC<SOC0 | SOC0≤SOC |
| REFORMER TEMP. T [°C] | T<T0 | POWER GENERATION/ CONSUMPTION BALANCE MODE | HEAT GENERATION/ DISSIPATION BALANCE MODE |
| | T0≤T | | COMPLETE STOP MODE |

*FIG. 17*

FUEL CELL POWER PLANT SYSTEM FOR MOVING BODIES AND CONTROL METHOD THEREOF

FIELD OF THE INVENTION

This invention relates to a fuel cell power plant system as a power source for a moving body such as a vehicle.

BACKGROUND OF THE INVENTION

JP2000-303836A published in 2000 and JP2001-307758A published in 2001 by the Japan Patent Office describe a technique for a fuel cell used as a power source of a moving body, wherein power generation by the fuel cell is stopped according to the running state of the moving body.

SUMMARY OF THE INVENTION

A moving body does not always require a fixed power generation amount. When the power generation is not required or the required power generation amount is small, it may be advantageous from the viewpoint of fuel efficiency to stop the fuel cell power plant and to supply power from a battery.

However, if the fuel cell power plant is stopped completely, when power generation is needed next time, it may not be possible to immediately supply the required power. This is because in order to maintain the power generation performance of the fuel cell power plant, the component elements of the plant must respectively be maintained at optimum temperatures, and if the temperature of these components falls due to stopping power generation, the power generation efficiency when power supply is resumed will fall and the power generation amount will decrease.

It is therefore an object of this invention to supply a required power with a good response when power generation by a fuel cell power plant is resumed after it has been stopped. It is a further object of this invention to reduce the fuel amount consumed when the fuel cell power plant is in a standby state.

In order to achieve above object, this invention provides a fuel cell power plant system for a moving body, comprising a drive device which drives the moving body by receiving power, a power plant having a fuel cell supplying power to the drive device and a fuel supply device which supplies fuel required for the fuel cell to generate power to the fuel cell, and a controller. When the moving body has stopped, the controller selects one operating mode from plural operating modes according to the running state of the power plant, the fuel cell not generating power to be supplied to the drive device in the plural operating modes, and controls the power plant based on the selected operating mode.

The details as well as other features and advantages of this invention are set forth in the remainder of the specification and are shown in the accompanying drawings.

BRIEF DESCRIPTION OF THE DRAWINGS

FIG. 7 is a flowchart showing a power plant operating mode selection process.

FIG. 8 is a table for selecting a power plant operating mode.

FIG. 14 is a table for selecting a power plant operating mode.

FIG. 17 is a table for selecting a power plant operating mode.

DESCRIPTION OF THE PREFERRED EMBODIMENTS

Embodiment 1

Figure 1:
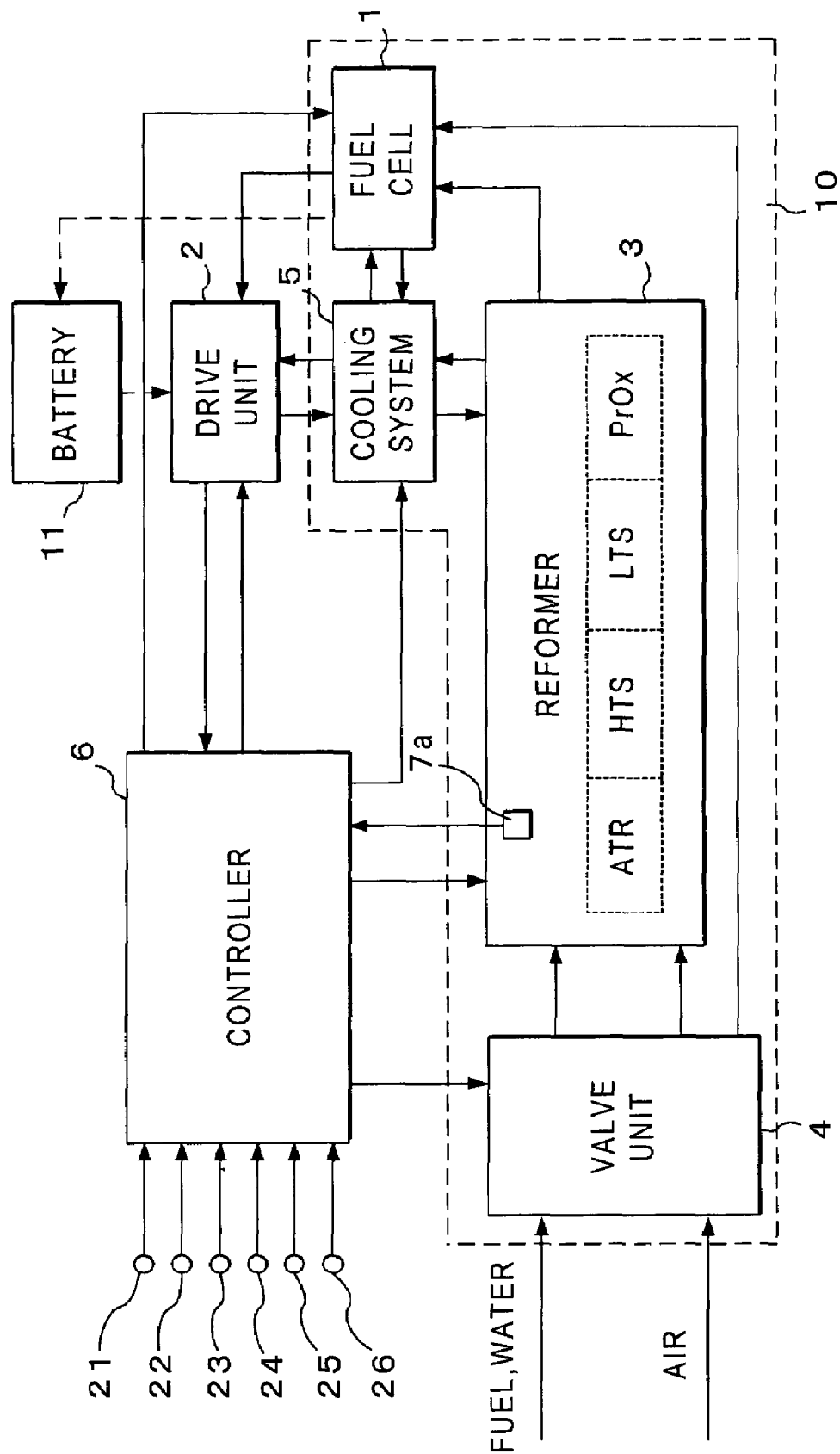
FIG. 1 is a block diagram showing a fuel cell power plant system for a moving body relating to this invention.

FIG. 1 shows a fuel cell power plant system for a moving body relating to this invention. In this embodiment, the moving body is a vehicle. A fuel cell 1 comprising plural cells uses hydrogen-rich reformate gas and air (oxygen) to generate power by an electrochemical reaction. The fuel cell 1 is connected to a drive unit 2 which receives power from the fuel cell to drive the vehicle. The drive unit 2 may for example be an electric motor.

The fuel cell 1 is connected to a reformer 3 which reforms a fuel such as a hydrocarbon, and supplies hydrogen-rich reformate gas to the fuel cell 1. In this embodiment, the reformer 3 comprises an ATR reactor which generates hydrogen-rich reformate gas from fuel, water and air while balancing a steam-reforming reaction which is an endothermic reaction with a partial oxidation reaction which is an exothermic reaction, an HTS reactor which performs a relatively high temperature shift reaction between carbon monoxide in the reformate gas and water to generate carbon dioxide and hydrogen, a LTS reactor which performs a relatively low temperature shift reaction, and a PrOx reactor which reduces the slight carbon monoxide amount contained in the reformate gas from the LTS reactor by a selective oxidation reaction. The reformer 3 further comprises a mixer which supplies air and water to each reactor, a vaporizer which vaporizes fuel and water, and a heat exchanger which adjusts the gas which flows into each reactor to a proper temperature.

A valve unit 4 which adjusts the fuel and water amounts supplied to the reformer 3 and the air amount supplied to the reformer 3 and the fuel cell 1 is provided upstream of the reformer 3. A cooling system 5 which cools the fuel cell 1, drive unit 2 and reformer 3 is provided so that the proper temperature is attained.

The reformer 3, fuel cell 1 and auxiliaries (valve unit 4, cooling system 5) form a power plant 10.

A battery 11 is connected to the fuel cell 1 and drive unit 2. The power generated by the fuel cell 1 can be stored by the battery 11, and the power stored in the battery 11 can also be supplied to the drive unit 2.

A controller 6 controls the power plant system 10, and it changes over between run and standby of the power plant 10 according to the running state of the vehicle as described later. When the power plant 10 is in the standby state, it is in a state where power is not supplied to the drive unit 2, i.e., a state wherein the fuel cell 1 and reformer 3 have stopped completely (complete stop mode), or a state in which it is running only for temperature maintenance of the power plant 10 (heat generation/dissipation balance mode), or when only the minimum power for the controller 6 and other electronic parts is supplied (power-generation/consumption balance mode).

Signals showing the running state of the vehicle, and signals which command the running state, are inputted into the controller 6. The signals showing the running state comprise a signal from an accelerator sensor 21 which detects an accelerator depression amount (vehicle load), a signal from a vehicle speed sensor 22 which detects a vehicle speed, a signal from a brake sensor 23 which detects a brake depression amount, a signal from a steering angle sensor 24 which detects a steering angle, a signal from a sensor 25 which detects a blinker state, and a signal showing the running state of an air-conditioner and other instruments. Signals which command running state comprise a signal from a starting switch 26 which detects a starting operation by a driver, for example.

A temperature sensor 7a which detects the temperature of the reformer 3 is fitted to the reformer 3, and the output of the temperature sensor 7a is inputted to the controller 6 as a signal showing the running state of the power plant 10.

Next, the control performed by the controller 6 will be described referring to FIG. 2 and FIG. 3.

Figure 2:
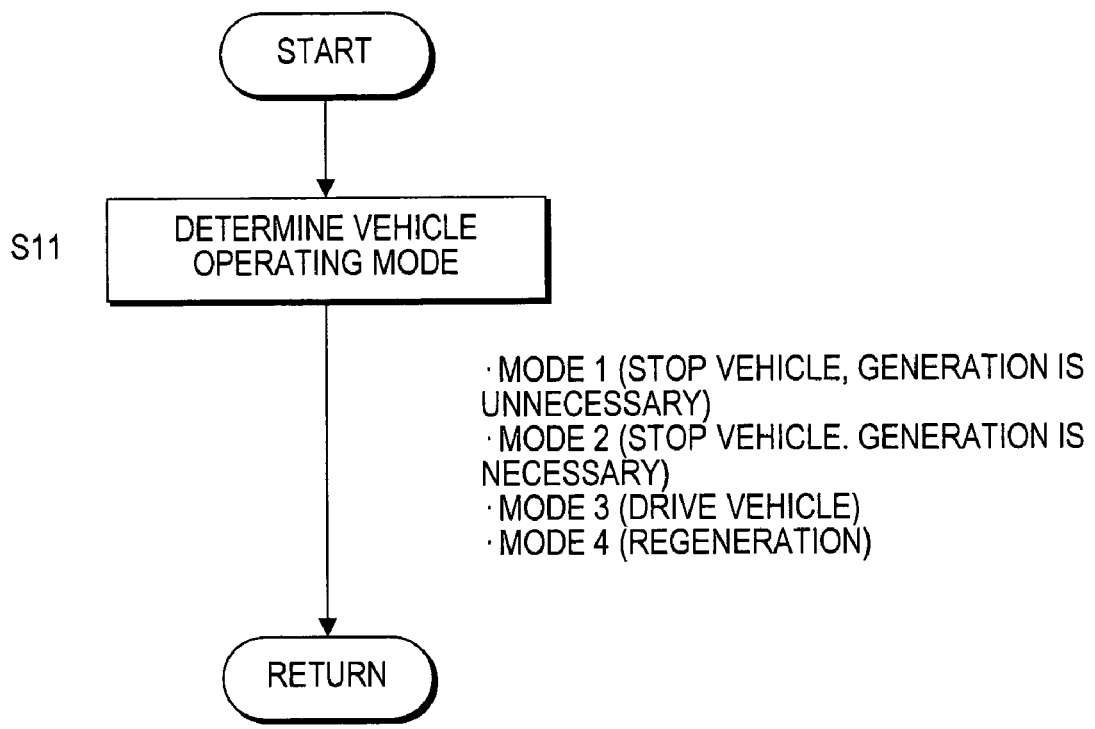
FIG. 2 is a flowchart showing a vehicle operating mode determining process.

FIG. 2 is a flowchart showing a process for determining a vehicle operating mode. This is executed by the controller 6 after the driver performs a startup operation and the vehicle is able to run, and is performed at a predetermined interval, such as every ten milliseconds.

In a step S11, the vehicle operating mode is determined. The operating modes determined are for example as follows:

[1] The vehicle has stopped, the power consumption of electronic parts is low, power consumption can be covered only by the power supply of the battery 11, and the fuel cell 1 does not need to generate power.

[2] The vehicle has stopped (power is not required to drive), but power generation by the fuel cell 1 is required since the power required by electronic parts can no longer be provided only by the power supply of the battery 11 or the charge amount of the battery 11 is low.

[3] Power is supplied to the drive unit 2 to run the vehicle, e.g., when the accelerator pedal is depressed to accelerate the vehicle.

[4] The energy of the vehicle is recovered such as when the vehicle decelerates. When the drive unit 2 is a motor, the motor functions as a generator.

If the power plant 10 is stopped completely, when power generation is resumed, the temperature of the fuel cell 1 or the reformer 3 may fall lower than the proper operating temperature, and it may be impossible to generate the required power amount with a sufficient response. On the other hand, if fuel supply to the power plant 10 is continued for temperature maintenance, fuel efficiency will worsen.

The operating temperature of the reformer 3 changes with the composition of the fuel used, and, when the fuel has a composition close to that of gasoline, ATR is about 800° C., HTS is about 300 to 400° C., LTS is from 200 to 300° C., and PrOx is 100 to 200° C. When the fuel has a composition near that of alcohol, ATR is 300 to 400° C., the shift reactor can often be omitted, and PrOx is almost the same as the above. The operating temperature of the fuel cell 1 is 60 to 100° C.

Hence, in this embodiment, in the first operating mode (vehicle stopped, power generation not required), the operating mode of the power plant 10 is selected based on the temperature of the reformer 3.

Figures 3, 4:
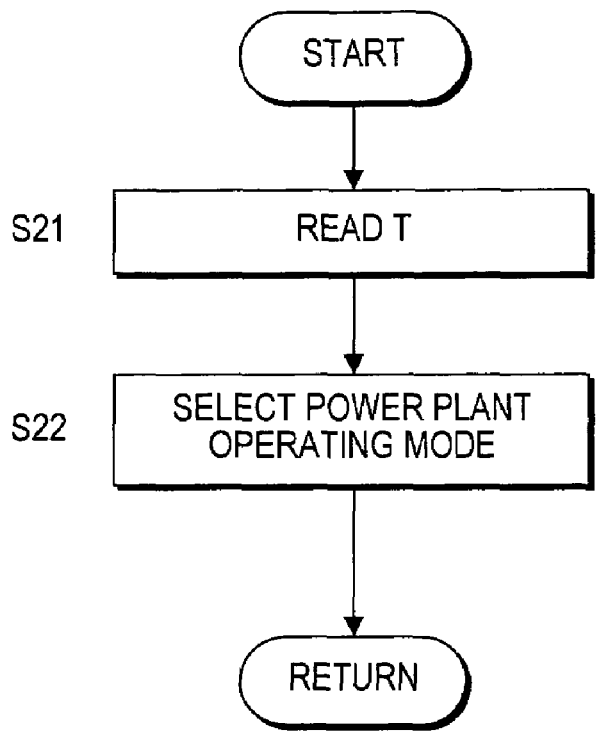
FIG. 3 is a flowchart showing a power plant operating mode selection process.
FIG. 4 is a table for selecting a power plant operating mode.
Figure 5:
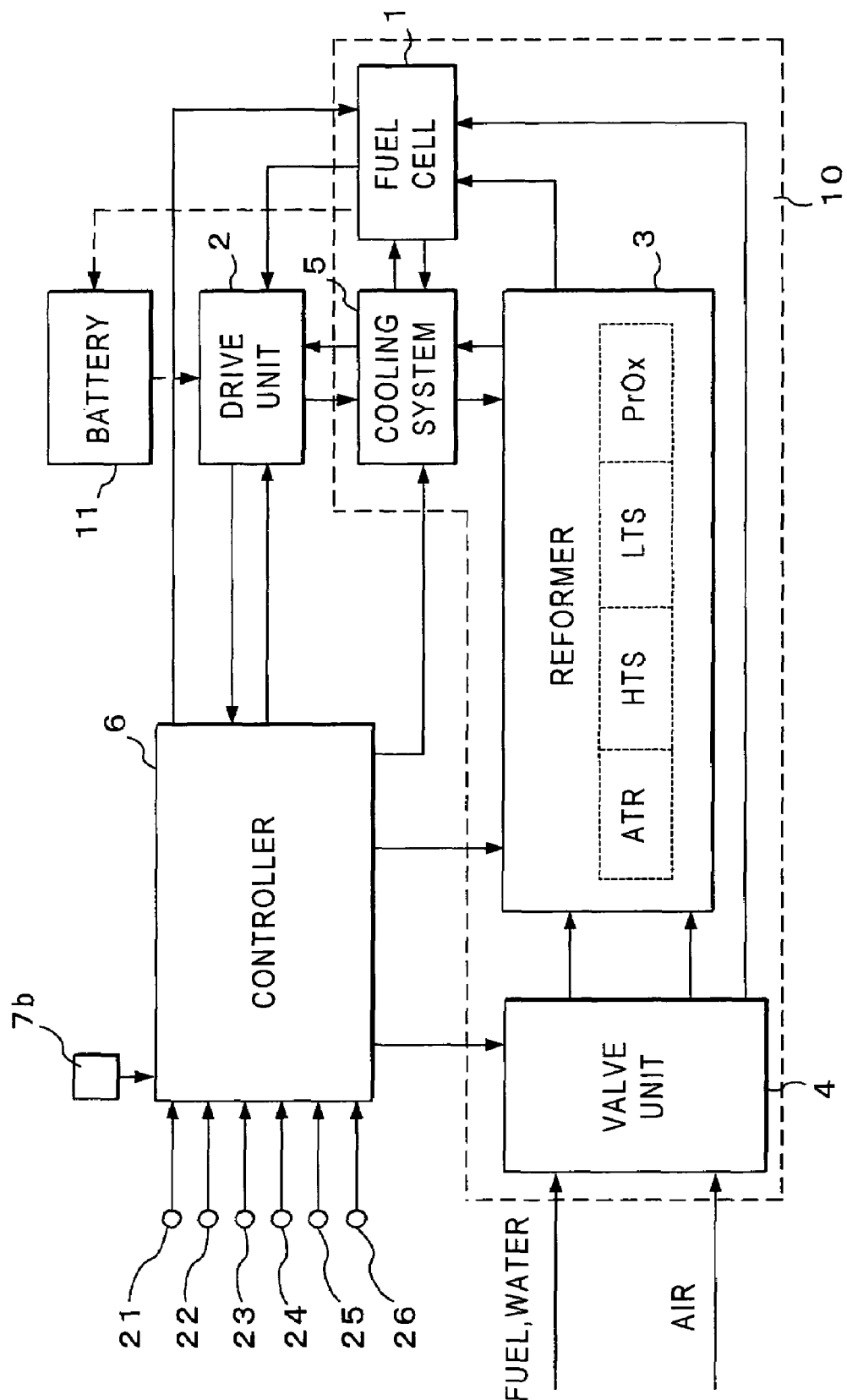
FIG. 5 is similar to FIG. 1, but showing the second embodiment.

FIG. 3 is a flowchart showing an operating mode selection process of the power plant 10. When the first operating mode is selected in the step S11, this flowchart is executed by the controller 6.

In a step S21, a reformer temperature T detected by the temperature sensor 7a is read.

In a step S22, the operating mode of the power plant 10 is selected based on the reformer temperature T. This selection is performed referring to the table of FIG. 4. If the reformer temperature T is higher than a predetermined temperature threshold T0, a complete stop mode is selected, and if lower than the temperature threshold T0, the heat generation/dissipation balance mode is selected.

The complete stop mode is an operating mode wherein the fuel cell 1 and the reformer 3 stop completely. If the power plant 10 runs continuously for a certain time and has reached a suitable temperature state, even if it is stopped completely, the temperature will not fall immediately and the response when power generation is resumed will not be impaired. Thus, when the reformer temperature T is higher than the temperature at which the minimum response of the power plant 10 can be guaranteed, the power plant 10 is stopped completely.

However, required power is supplied to the controller 6 and is not stopped. In order to protect an injector in contact with the evaporator at high temperature from heat damage, pumps for recirculating water for cooling and fuel, do not stop. In other words, devices which safeguard the function of the power plant 10 are not stopped.

On the other hand, the heat generation/dissipation balance mode which is selected when the reformer temperature T is lower than a threshold T0, runs the power plant 10 so that this is accompanied by the absolute minimum generation of heat. As each reactor of the reformer 3 operates at a relatively high temperature, if it stops, a temperature drop accompanying heat dissipation due to the difference of temperature with the atmosphere cannot be avoided. A heat insulating material is used so that heat dissipation from the reformer 3 or fuel cell 1 is lessened, but there is a limitation to the amount of heat insulating material which can be used in a power plant for vehicles.

If the power plant 10 is operated so that heat dissipation and heat generation are balanced, the power plant 10 containing the reformer 3 can be maintained at the minimum temperature required to demonstrate a good response when power generation is resumed, or in other words, the temperature at which the power plant 10 can be maintained in the active state.

In ATR, among the reactors of the reformer 3, the rate of the partial oxidation reaction of a very small amount of fuel is arranged to be higher than that of the steam-reforming reaction which is an endothermic reaction, so the vehicle can be run with a larger heat generation. As the shift reaction performed by HTS and LTS and the selective oxidation reaction performed by PrOx are also exothermic reactions, by adjusting the water or the air amount appropriately, the vehicle can be run so that heat dissipation and heat generation are balanced.

Although PrOx usually suppresses oxidation of hydrogen and oxidizes carbon monoxide selectively, hydrogen may also be oxidized in order to increase heat generation.

When warming up of the power plant 10 is not fully completed, or when the temperature of only a specific reactor falls, the temperature may be made to rise to a suitable temperature by running the power plant under conditions where the heat generation amount slightly exceeds heat dissipation. Further, the flowrate and temperature of the coolant in the cooling system 5 may be suitably controlled, and heat dissipation from the reformer 3 suppressed.

In the table of FIG. 4, T0 is shown as the threshold of the reformer temperature T. This is the threshold set for the temperature of a typical point when reformer heat insulation characteristics are set so that each reactor having a different operating temperature radiates heat equally. However, if the temperature threshold of each reactor is set and the temperature is detected for every reactor, as long as at least one is lower than the threshold, the heat generation/dissipation balance mode can be selected. In this case, if supply of air which is an oxidizing agent is enabled at the inlet of each reactor, by supplying the proper air amount only to the reactor whose temperature is lower than the threshold, only the temperature of the reactor whose temperature fell is appropriately increased.

If the second operating mode is determined in the step S11 of FIG. 2, i.e., when the fuel cell 1 needs to generate power, such as when the vehicle has stopped, the power consumption of electronic parts cannot be covered by battery power and the storage amount of the battery is small, the power plant 10 may be operated also in the power generation/consumption balance mode which provides only the power required by electronic parts including the controller 6 (power consumption other than the drive unit 2).

The pump and compressor for delivering fuel and air to the reformer 3 are designed so that the maximum efficiency is obtained at a predetermined pressure and flowrate, and if they are operated under conditions differing from this, efficiency will fall. Even in a zero power generation state, some electrical devices like the controller 6 consume power for operation. If the system is designed so that the reformate gas amount, air, water or fuel can be adjusted according to the required power generation amount over a wide range from a very small power generation amount to the maximum power generation amount, highly precise valves will be needed and costs will increase.

Then, as long as a valve can be designed at a reasonable cost or a special flowpath can be formed to adjust the reformate gas or fuel flowrates depending on the minimum required power without decreasing the efficiency too much even when the power plant 10 is operated at low load including the pump or compressor, the power generation/consumption balance mode wherein sufficient power is generated to cover power consumption other than the drive unit 2 can be set.

According to the first embodiment, the following effects are obtained.

In the operating mode wherein the vehicle has stopped and does not require power generation for drive, as the operating mode of the power plant 10 is selected according to the running state of the power plant 10 from plural operating modes, for example the complete stop mode and heat generation/dissipation balance mode, good fuel consumption can be maintained without impairing response when power generation is resumed, If restarting can be guaranteed, even if power generation of the power plant 10 is completely stopped when the complete stop mode is selected, fuel consumption can be maintained at an optimum level while guaranteeing power generation response. When the heat generation/dissipation balance mode, in which the power plant 10 is made to generate power at the temperature where the power plant 10 can be maintained in an active state, is selected, the power plant 10 can resume power generation immediately with high efficiency while suppressing fuel consumption.

If the power generation/consumption balance mode which generates power according to the power consumption outside the power plant 10 is also included as an operating mode of the power plant 10, by supplying power from the power plant 10 according to the power consumption, the load on the battery is mitigated while preparing for the next resumption of power generation.

Since the optimal operating mode is selected from among plural operating modes based on the temperature of the power plant 10, by maintaining the temperature of the power plant 10 at an appropriate level, both the required power generation response and high fuel cost-performance can be ensured.

By using the temperature of the fuel supply device, for example, the reformer 3, as the temperature of the power plant 10, control can be performed based on the temperature of the part which most affects response when power generation is resumed, and good power generation response with high efficiency can be ensured.

As the complete stop mode is selected when the temperature of the power plant 10 is higher than a predetermined temperature and the heat generation/dissipation balance mode is selected when it is lower than the predetermined temperature, a high power generation response can be guaranteed without supplying unnecessary fuel.

Embodiment 2

The second embodiment will now be described referring to FIG. 5-FIG. 8.

In the second embodiment, the operating mode of the power plant 10 is selected according to the running state of the power plant 10, i.e., the immediately preceding running time and the stopping time. The fundamental construction of the system is the same as the first embodiment, the difference being that the temperature sensor 7 of the reformer 3 is omitted, and the controller 6 is provided with a counter 7b which measures the running time and the stopping time of the power plant 10.

Figure 6:
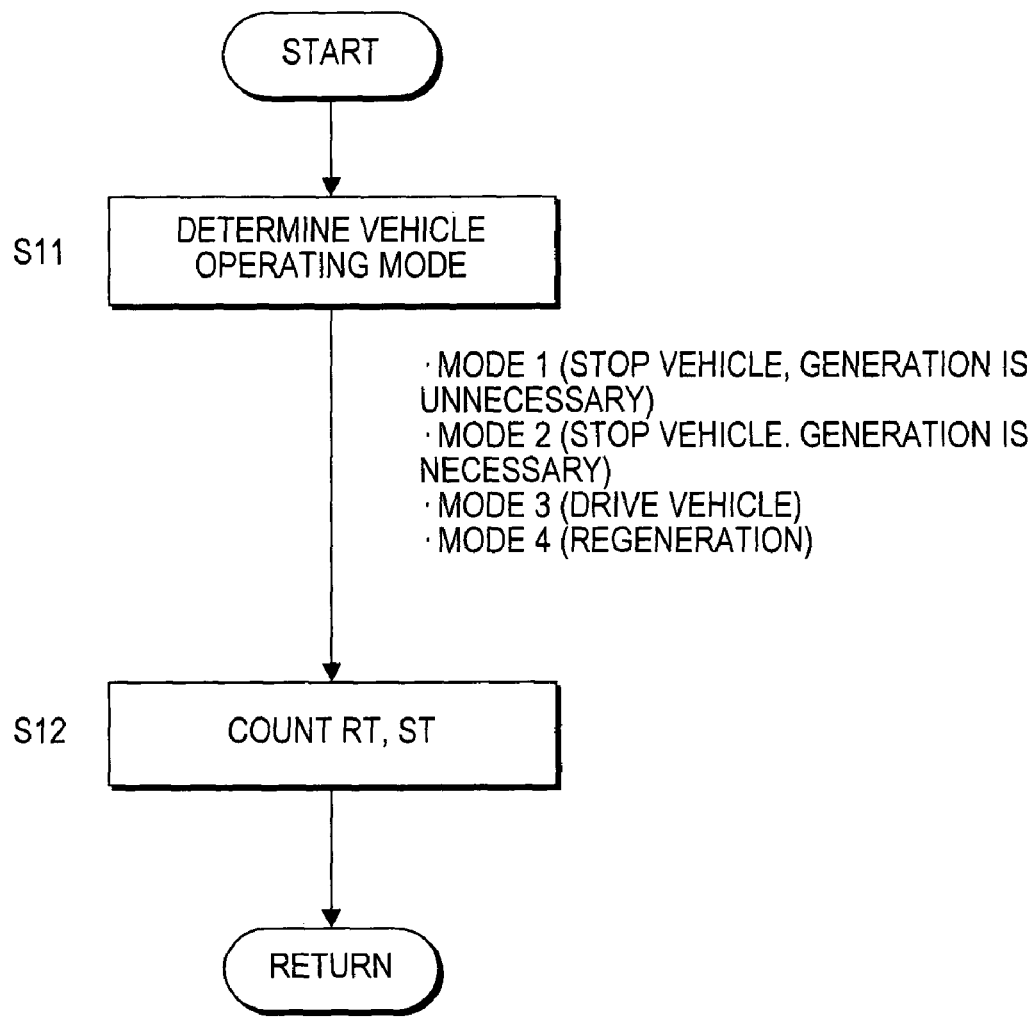
FIG. 6 is a flowchart showing a vehicle operating mode determining process.

FIG. 6 is a flowchart showing a vehicle operating mode determining process, and is performed at a predetermined interval, e.g., ten milliseconds, by the controller 6.

In a step S11, the operating mode of the vehicle is determined. The operating mode determined is the same as that of the first embodiment.

In a step S12, the running time and stopping time of the power plant 10 are counted, respectively.

In the first operating mode wherein the vehicle has stopped and power generation is not required the operating mode of the power plant 10 is selected based on the running time and the stopping time of the power plant 10.

FIG. 7 is a flowchart showing an operating mode selection process of the power plant 10, and is performed by the controller 6 when the first operating mode (vehicle stop, power generation unnecessary) is determined in the step S11.

In a step S31, a running time RT of the power plant 10 until the power plant 10 enters a standby state, and a stopping time ST which is the time from when the power plant 10 entered the standby state, are read.

In a step S32, the operating mode of the power plant 10 is selected by looking up a table shown in FIG. 8 based on the running time RT and stopping time ST of the power plant 10.

As the flowchart of FIG. 7 is performed during the first operating mode, when the flowchart of FIG. 7 is performed for the first time, the immediately preceding stopping time (minutes) will definitely be "ST<5" in FIG. 8. Therefore, when the flowchart of FIG. 7 is performed for the first time, the operating mode of the power plant 10 is selected according to the length of running time RT on the immediately preceding occasion when the power plant 10 was running. The selection is performed in three running time categories (minutes) on the immediately preceding occasion ("RT<10", "10≦RT<15", and "15≦RT"). For example, if the immediately preceding running time RT was 8 minutes, this will be classified as "RT<10" and the heat generation/dissipation balance mode will be selected. If the immediately preceding running time RT was 12 minutes, this will be classified as "10≦RT<15" and the complete stop mode will be selected. If the immediately preceding running time RT was 15 minutes or more, this will be classified as "15≦RT" and the complete stop mode will be selected.

As the temperature of the power plant 10 is higher, the longer is the running time immediately prior to stopping, the temperature does not immediately fall even if there is a complete stop, and the power plant 10 can be run at the predetermined power generating efficiency when there is the next power generation requirement, so the complete stop mode tends to be selected as the operating mode of the power plant 10, the longer is the immediately preceding running time.

When the power plant 10 is in the standby state, counting of the stopping time ST of the power plant 10 is started. When the immediately preceding running time is classified as "10≦RT<15" and the power plant 10 has entered the standby state, the complete stop mode is maintained until the stopping time is 5 minutes, but after 5 minutes, the immediately preceding stopping time (minutes) is classified as "10RT<15" and the heat generation/dissipation balance mode is selected. If the first operating mode where the vehicle stops and power generation is not required continues thereafter, the heat generation/dissipation balance mode is maintained until 10 minutes has elapsed.

The 5 minutes and 10 minutes given here are threshold values determined considering the following.

If the outside air temperature is the same, the heat dissipation is larger, the higher is the temperature of each element of the reformer 3, and the heat dissipation is smaller, the lower is the temperature. Specifically, if the power plant 10 is run so that the heat generation in each element of the reformer is fixed when the outside air temperature is assumed constant, the heat generated exceeds the heat dissipated so the temperature of each element continues rising to a certain temperature, but if this temperature is exceeded, the heat dissipated exceeds the heat generated, so the temperature of each element falls. In other words, it will be in an equilibrium state at a certain temperature.

The above 5 minutes is the time from when it enters the complete stop mode from the equilibrium state, until it falls to the temperature at which the minimum response can be guaranteed, and the above 10 minutes is the time from when it begins to run in the heat generation/dissipation balance mode until it effectively reaches the equilibrium state.

However, as these times are determined according to the outside air temperature, it is preferred to provide an outdoor temperature sensor and change over a table according to the outside air temperature, or obtain date information correlated to the outside temperature from a clock and navigation system installed on the vehicle, and change over a table.

According to the second embodiment, one operating mode is selected as the operating mode of the power plant 10 from plural operating modes based on the running time before the power plant 10 enters the standby state, and the stopping time after it has entered the standby state, so the most suitable operating mode can be selected according to the running state of the power plant 10, and fuel cost-performance and power generation response can both be achieved.

The longer is the running time before the power plant 10 enters the standby state, or the shorter is the time after it has entered the standby state, the greater is the tendency to select the complete stop mode. Also, the shorter is the running time before the power plant 10 enters the standby state, or the longer is the time after it has entered the standby state, the greater is the tendency to select the heat generation/dissipation balance mode.

As the temperature of the power plant 10 is higher, the longer is the running time before the power plant 10 enters the standby state, even if the power plant 10 is set in the complete stop mode, power can be generated with a sufficient response when power generation is resumed, and fuel cost-performance can be correspondingly improved. On the other hand, when the temperature of the power plant 10 is not so high as when the running time is short, the heat generation/dissipation balance mode is selected, the temperature of the power plant 10 is maintained, and a high response can be guaranteed when power generation is next required.

Embodiment 3

Figure 9:
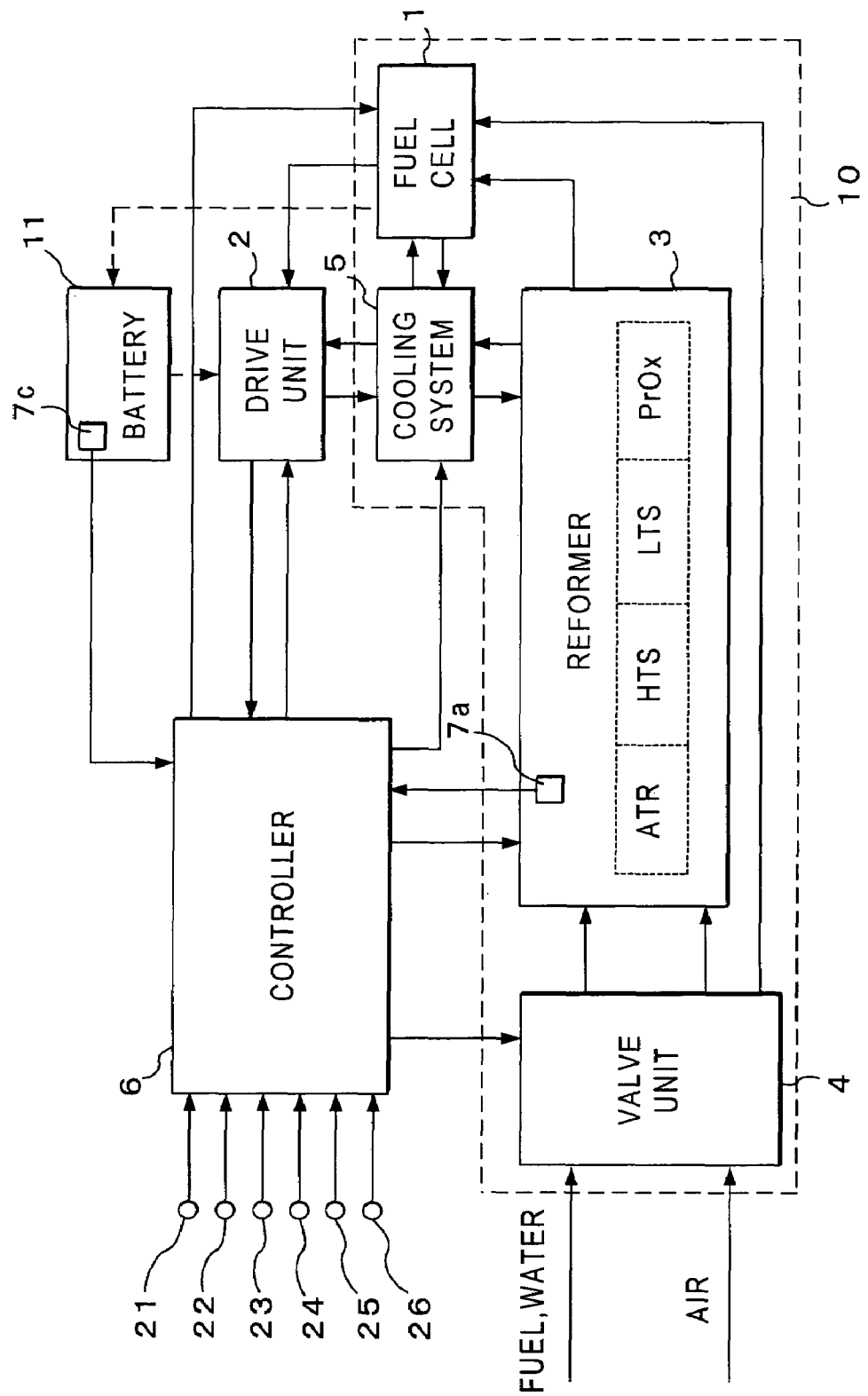
FIG. 9 is similar to FIG. 1, but showing the third embodiment.

The third embodiment will now be described referring to FIG. 9-FIG. 11.

In the third embodiment, an SOC sensor 7c which detects the charge state SOC of the battery 11 as the running state of the power plant 10 is provided, and the complete stop mode, heat generation/dissipation balance mode or power generation/consumption balance mode is selected as the operating mode of the power plant 10 based on the SOC.

As shown in FIG. 9a, a signal from the SOC sensor 7c and a signal from the temperature sensor 7a of the reformer 3 are inputted to the controller 6.

Figures 10, 11:
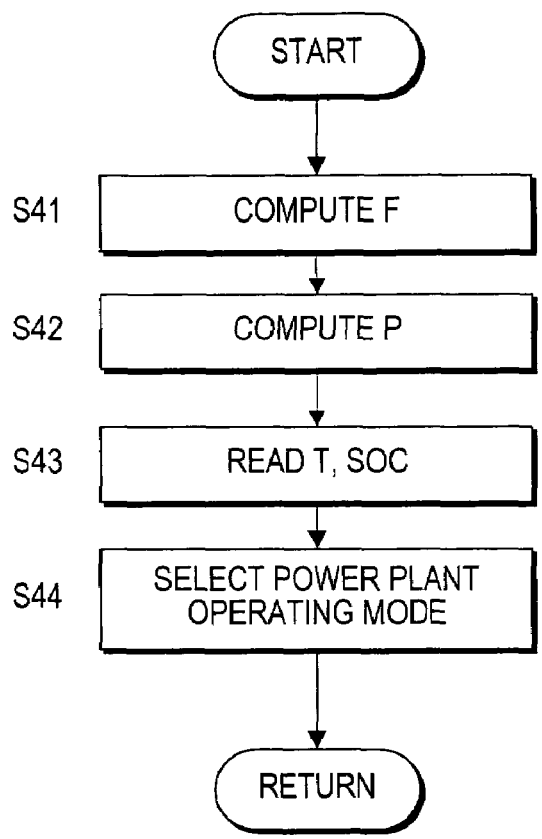
FIG. 10 is a flowchart showing a power plant operating mode selection process.
FIG. 11 is a table for selecting a power plant operating mode.

FIG. 10 is a flowchart showing an operating mode selection process of the power plant 10, and after the driver performs a startup operation and changes over to a state wherein the vehicle can run, it is performed at a predetermined interval, e.g., ten milliseconds, by the controller 6.

In a step S41, a drive force (motor driving force) F required by the vehicle is calculated, based on a signal showing the running state of the vehicle, for example the accelerator depression amount signal.

In a step S42, a power P required to generate the driving force F is calculated.

In step S43, the charge state SOC of the battery 11 and the reformer temperature T are read.

In a step S44, it is determined whether to operate the power plant 10 or whether to put it on standby based on the running state of the vehicle, and when the power plant 10 is put on standby, based on the running state of the power plant 10, the complete stop mode, heat generation/dissipation balance mode or power generation/consumption balance mode is selected as the operating mode of the power plant 10.

When the power plant 10 is put on standby, the complete stop mode, heat generation/dissipation balance mode or power generation/consumption balance mode is selected referring to the table shown in FIG. 11. According to the table shown in FIG. 11, when the charge state SOC of the battery is less than SOC0 (for example, 30%), the power generation consumption balance mode is selected regardless of the reformer temperature T, and power is generated by the fuel cell 1 so that the generated power balances with the power consumption of electronic parts. If all the power supply is obtained from the battery 11 when the charge state SOC is less than SOC0, the residual amount in the battery 11 may be insufficient, so the required power is provided by the power generation of the fuel cell 1 without performing a complete stop of the power plant 10, and the load on the battery 11 is mitigated.

If the charge state SOC is less than SOC0, the reformer temperature T at that time will be referred to. If the reformer temperature T is lower than the threshold T0, the heat generation/dissipation balance mode is selected, and if it is higher than T0, the complete stop mode is selected. As the residual amount of the battery 11 is sufficient, the complete stop mode is selected when the reformer temperature T is higher than T0 at which the next power generation demand can be immediately satisfied, whereas when the reformer temperature T is less than T0, the heat generation/dissipation balance mode is selected so the reformer 3 is maintained at an efficient temperature.

The figure of 30% is only an example. The charge state SOC at which a necessary minimum response is guaranteed even if the next power generation demand is large, is taken as the threshold SOC0.

The reformer temperature T is a representative temperature of the reformer 3. However, as described above, the threshold temperature can be set for each component of the reformer 3, the temperature of each reformer component can be detected, and the heat generation/dissipation balance mode can be selected when one of the reformer components is less than the threshold value.

In the above description, the situation was described where the power plant 10 was put into the standby state when the vehicle had stopped, but the power plant 10 may be put into the standby state even if the vehicle is running.

The power plant 10 generates power from fuel, air and water, so it is desirable that it can be run with sufficient fuel, air and water to cover power requirements at that time.

However, as described above, due to various practical reasons, the fuel amount required to generate a predetermined power amount is different depending on the power to be generated. In other words, the efficiency of the power plant 10 is different depending on the power generation amount, and below a predetermined amount, it is better not to run the power plant 10.

Hence, the power plant 10 and the battery 11 are closely coordinated to work together. When the required power is less than a minimum power determined from the efficiency of the power plant 10, if the charge state SOC of the battery 11 is low, the power apart from that required for driving the vehicle is used to charge the battery 11, whereas if it is high, the power plant 10 is stopped and the vehicle is driven by the battery 11. In other words, even if the vehicle is running, depending on the power required for drive force and the charge state SOC of the battery 11 at that time, the vehicle can be driven in an operating mode wherein the power plant 10 generates almost no power.

According to third embodiment, the following effects are obtained.

One operating mode is selected from among plural operating modes as the operating mode of the power plant 10 based on the charge state of the battery 11, so for example if the charge state of the battery 11 is sufficient, an operating mode of the power plant 10 (heat generation/dissipation balance mode or complete stop mode) can be selected wherein the required responsiveness of the battery 11 can be ensured and fuel cost-performance is optimum.

When the charge state of the battery is low, the power generation/consumption balance mode is selected, so the load on the battery 11 when the power plant 10 is on standby can be mitigated, and responsiveness when power generation is resumed can be ensured.

One operating mode is selected from among plural operating modes based on the charge state of the battery 11 and temperature of the power plant 10 as the running state of the power plant 10. In particular, when the charge amount of the battery 11 is small, the power generation/consumption balance mode is selected regardless of the temperature. When the charge amount of the battery 11 is large, if the reformer temperature is low, the heat generation/dissipation balance mode is selected, whereas if the reformer temperature is high, the complete stop mode is selected. Therefore, maximum use can be made of the functionality of the battery 11, unnecessary fuel consumption can be suppressed and a high power generation responsiveness can be ensured.

Embodiment 4

The fourth embodiment will now be described referring to FIG. 12-FIG. 14.

According to the fourth embodiment, the difference from the third embodiment is that, instead of detecting the temperature of the reformer 3 as the running state of the power plant 10, the running time and stopping time of the power plant 10 are counted to select the operating mode of the power plant 10 as in the case of the second embodiment.

Figure 12:
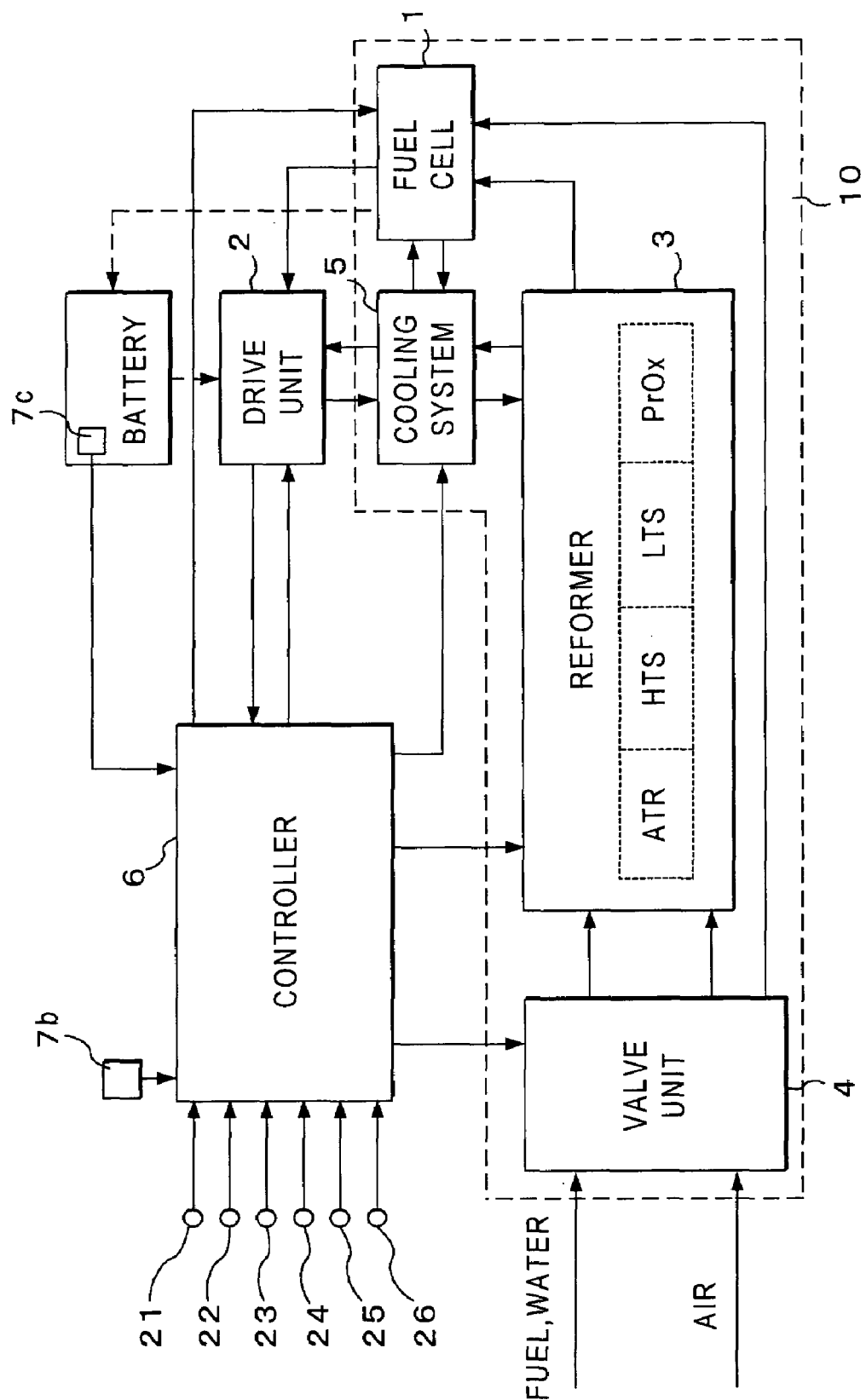
FIG. 12 is similar to FIG. 1, but showing the fourth embodiment.

As shown in FIG. 12, a signal from the SOC sensor 7c and a signal from the counter 7b are input to the controller 6.

Figure 13:
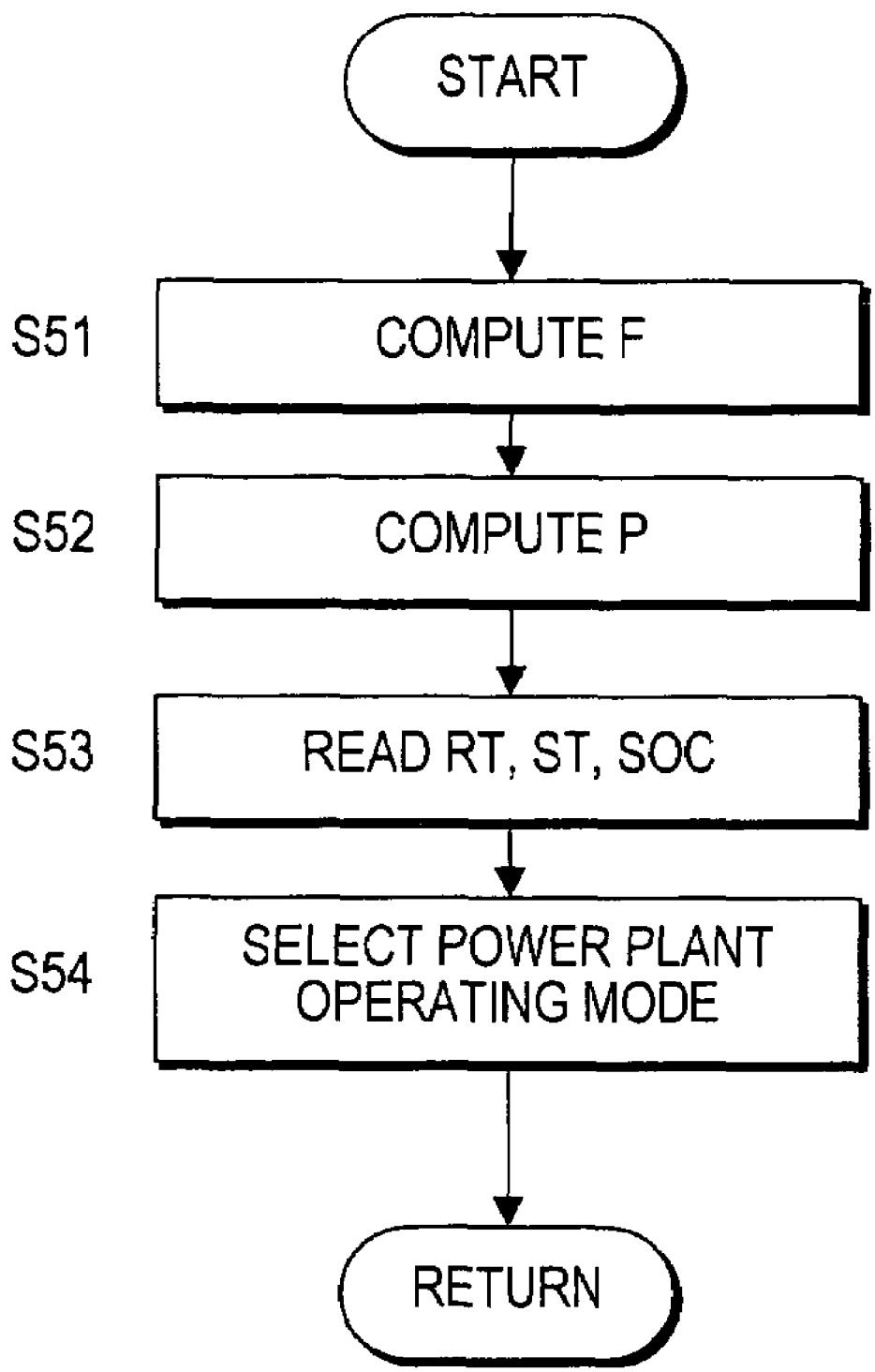
FIG. 13 is a flowchart showing a power plant operating mode selection process.

FIG. 13 is a flowchart showing a process for selecting the operating mode of the power plant 10, and is performed by the controller 6 after the driver performs a start-up operation and the vehicle is capable of running.

In a step S51, a drive force F required by the vehicle is computed based on a signal showing the vehicle running state, e.g. the accelerator depression amount signal.

In a step S52, a power P required to generate the drive force F is calculated.

In a step S53, the charge state SOC of the battery 11, and the running time RT and stopping time ST of the power plant 10, are read.

In a step S54, is determined whether to run the power plant 10 or put it on standby based on the vehicle running state, and if the power plant 10 is put on standby, one of the complete stop mode, heat generation/dissipation balance mode and power generation/consumption balance mode is selected as the operating mode of the power plant 10 based on the running state of the power plant 10.

When the power plant 10 is put on standby, one of the complete stop mode, heat generation/dissipation balance mode and power generation/consumption balance mode is selected based on the immediately preceding stopping time ST and running time RT of the power plant 10, and the battery SOC, by looking up a table shown in FIG. 14.

If the charge state SOC of the battery 11 is less than SOC0 (e.g., 30%), the power generation/consumption balance mode is selected regardless of the reformer temperature T, and the power plant 1 is made to generate power to cover the power consumption of electronic parts.

On the other hand, if the charge state SOC of the battery 11 is larger than SOC0, one of the complete stop mode, heat generation/dissipation balance mode and power generation/consumption balance mode is selected depending on how long the power plant 10 was continuously in the running state or stopping state on the immediately preceding occasion, as in the case of the setting of the table shown in FIG. 8. This is completely identical to the processing of the second embodiment, and a detailed description will therefore be omitted.

The fourth embodiment has the following effects.

One operating mode is selected from among plural operating modes based on the charge state SOC of the battery 11, the running time RT before the power plant 10 entered the standby state and the stopping time ST after it entered the standby state, as the operating mode of the power plant 10. Hence, the optimum operating mode suited to the real state of the power plant 10 can be selected, and as the function of the power plant 10 is complemented by the charge state of the battery 11, a good power generation responsiveness can be ensured without impairing fuel cost-performance.

As the operating mode of the power plant 10, when the charge amount of the battery 11 is small, the power generation/consumption balance mode is selected regardless of the running time RT before entering the standby state. When the charge amount of the battery 11 is large, the complete stop mode tends to be selected the longer is the running time RT prior to when the power plant 10 entered the standby state, and the shorter is the time ST from when it entered the standby state. Also, the heat generation/dissipation balance mode tends to be selected the shorter is the running time RT prior to when it entered the standby state, and the longer is the time ST from when it entered the standby state. Hence, a high power generation responsiveness can be maintained with maximum fuel efficiency.

Embodiment 5

Figure 15:
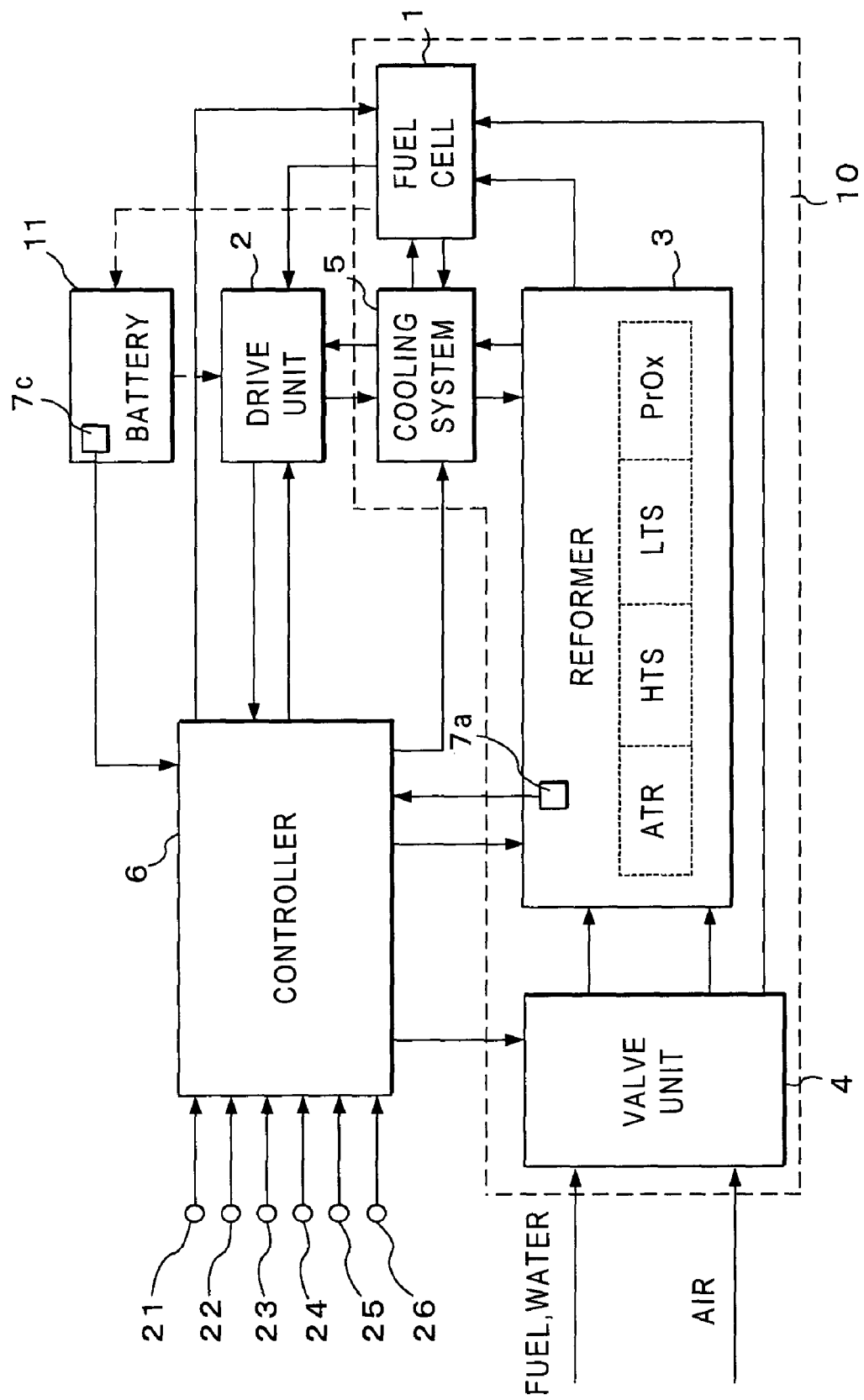
FIG. 15 is similar to the first embodiment, but showing the fifth embodiment.

The fifth embodiment will now be described referring to FIG. 15-FIG. 17.

According to the fifth embodiment, the threshold values (threshold values T0,SOC0) for selecting the operating mode of the power plant 10 are modified based on the vehicle running state, e.g., the vehicle weight and average vehicle speed when the vehicle weight is large or when the vehicle is traveling on an expressway. In this way, in a running state where are a high responsiveness is required of the power plant 10, even if the power plant 10 is put on standby, it is attempted to avoid the complete stop mode as far as possible so that maximum power can immediately be supplied when power generation is next resumed.

Figure 16:
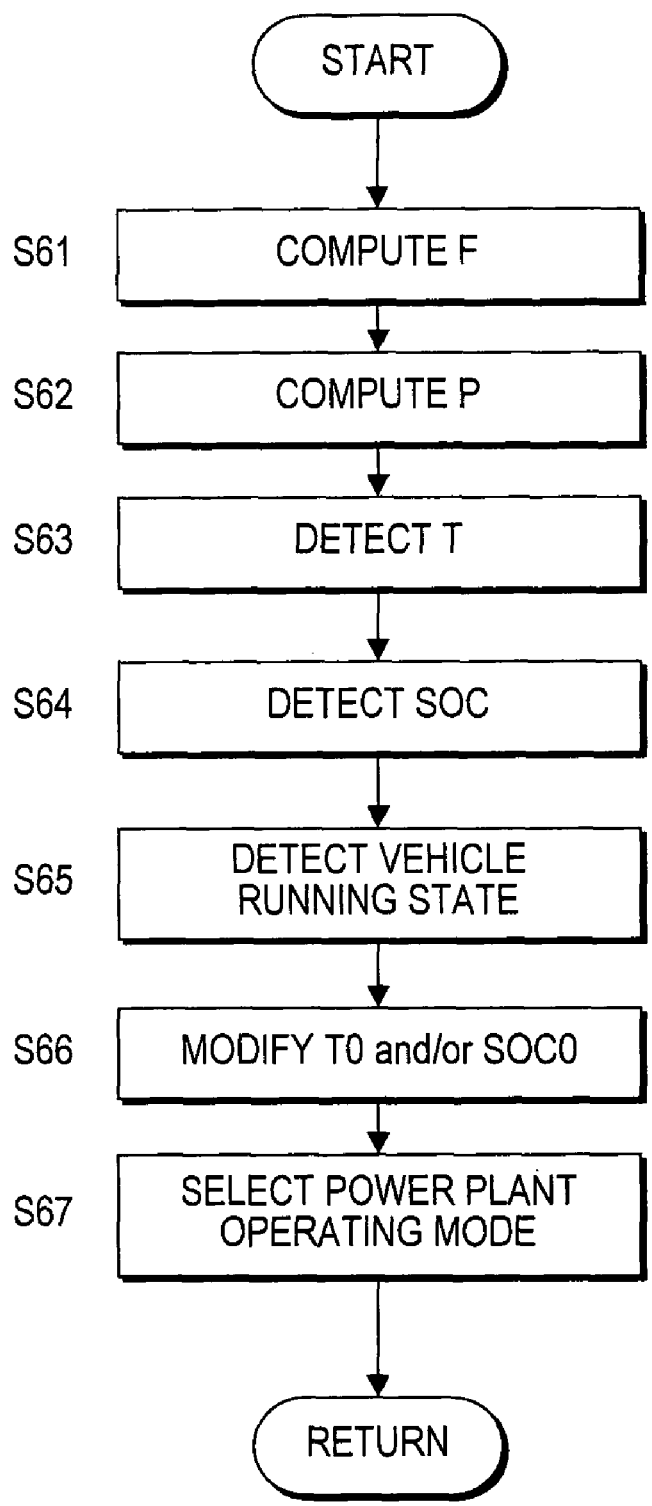
FIG. 16 is a flowchart showing a power plant operating mode selection process.

FIG. 16 shows the processing for selecting the operating mode of the power plant 10, which is repeatedly executed by the controller 6.

In steps S61-S64, the vehicle drive force F and required power P are computed, and the reformer temperature T and battery SOC are read.

In a step S65, the vehicle running state is detected. For example, as the vehicle running state, a vehicle weight W is estimated from the vehicle drive force and the variation amount of the vehicle speed (acceleration) at that time.

If the result of dividing the drive force by the vehicle speed is taken as a vehicle weight index, this index increases the larger the vehicle weight. For an identical drive force, for example, the vehicle speed tends to decrease when the vehicle weight is larger, and in this case, the vehicle weight index increases. Therefore, the vehicle weight index may be used instead of the vehicle weight.

When the vehicle weight W increases due to an increase in the number of passengers or an increase in the load, a large drive force is required to obtain the same acceleration. At this time, if the threshold value T0 of the reformer temperature T is modified to be larger so that the power plant 10 does not easily enter the complete stop mode when the power plant 10 is put on standby, the temperature of the reformer 3 can be maintained high, and the responsiveness of the power plant 10 is correspondingly enhanced. For this purpose, in a step S66, the threshold value T0 is modified. If the vehicle weight W is larger than the threshold value W0, the threshold value T0 is modified to be larger.

In a step S67, it is determined whether the power plant 10 is to be run or put on standby, and if the power plant 10 is to be put on standby, one of the complete stop mode, heat generation/dissipation balance mode and power generation/consumption balance mode is selected as the operating mode of the power plant 10 based on the running state of the power plant 10.

If the power plant 10 is to be put on standby, the operating mode of the power plant 10 is selected by looking up a table shown in FIG. 17 based on the temperature T of the reformer 3 and the charge state SOC of the battery 11. When the vehicle weight W is larger than the threshold value W0, the threshold value T0 is modified to be larger, so the number of occasions when the power plant 10 enters the complete stop mode correspondingly decreases, the temperature of the power plant 10 on standby is maintained at a correspondingly higher level, the maximum power can be immediately generated when power generation is next resumed, and rapid vehicle running is ensured.

The threshold value SOC0 may be modified instead of the threshold value T0 or both the threshold value T0 and the threshold value SOC0 may be modified. If the threshold value SOC0 is modified, when the vehicle weight W is greater than the threshold value W0, the threshold value SOC0 is modified to be larger.

The threshold values T0,SOC0 may also be continuously modified according to the vehicle weight W.

As an indicator of the running state, not only the vehicle weight W can be used. For example, the type of road on which the vehicle is traveling can be estimated based on a vehicle speed signal, and it can be estimated that when the average vehicle speed is high, it is traveling on an expressway. When a relatively gentle downward slope continues on an expressway, the drive force is small even though the vehicle speed is high. In this case, as described above, the power plant 10 can be put on standby, but if there is a relatively sharp upward slope after the downward slope, the power plant 10 is required to generate power with a fast response. Moreover, as the vehicle speed is high, the vehicle turning resistance and air resistance are high, so even better responsiveness and high power are required.

Therefore, when for example the average vehicle speed exceeds a predetermined value, it is determined that the vehicle is traveling on an expressway, so the threshold values T0,SOC0 are modified to be higher, and responsiveness of the power plant 10 is ensured by making it difficult for the power plant 10 to enter the complete stop mode. The threshold values T0,SOC0 may be continuously modified depending on the vehicle speed.

When the vehicle stops temporarily such as at an intersection, the threshold value T0 and the threshold value SOC0 may then be increased to make it difficult for the power plant 10 to enter the complete stop mode, which ensures acceleration performance on the next occasion the vehicle is started. The temporal stop of the vehicle can be detected based on the vehicle speed signal, brake signal, blinker state signal and steering angle signal. For example, when the vehicle speed is zero, the brake is depressed and the blinker operates, it can be determined that the vehicle stops temporally at an intersection.

Further, even in an operating mode where the accelerator depression amount is relatively large, acceleration performance can be enhanced by increasing the threshold values T0,SOC0 in the same way.

Figure 18:
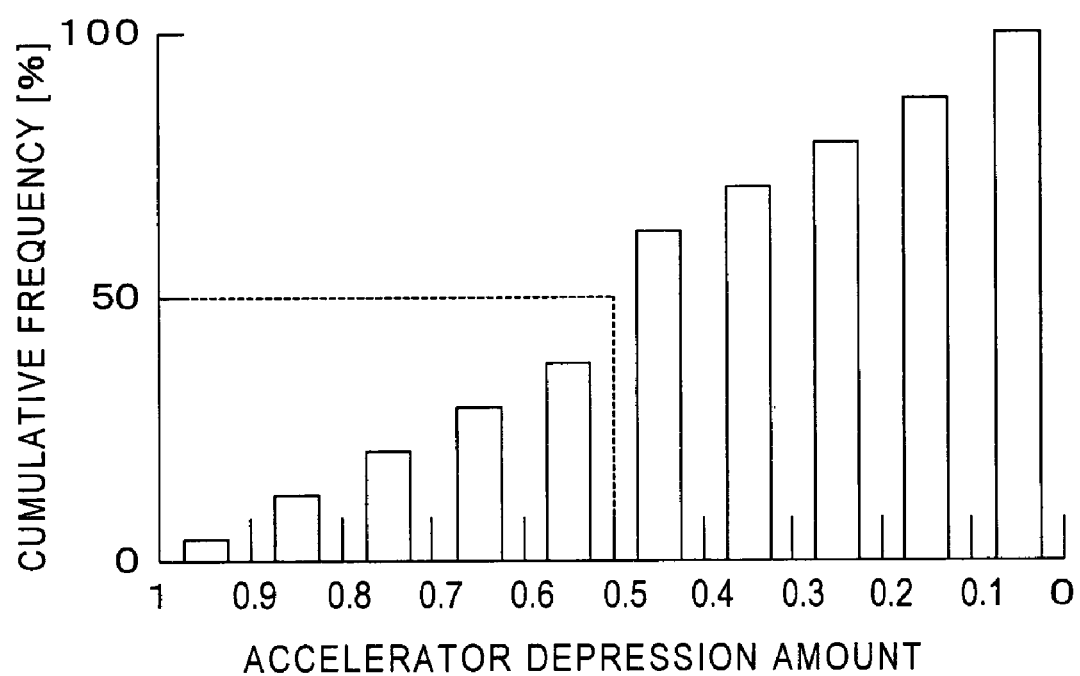
FIG. 18 shows the cumulative frequency distribution of an accelerator depression amount.

Specifically, as shown in FIG. 18, the accelerator depression amount is represented for example on a scale of zero when the accelerator is fully released to one when it is fully depressed, and this interval is divided into ten equal parts to calculate a frequency distribution. The accelerator depression amount is sampled every second. If at a given moment the accelerator depression amount is zero, the frequency in the first interval is incremented by one, and if it is a maximum, the frequency in the tenth interval is incremented by one. This is continued for 10 minutes (600 seconds). 600 samples are collected and represented by the cumulative frequency distribution in the figure. In the figure, it is attempted to detect whether the accelerator depression amount tends to be large, so a summation is made from larger accelerator depression amounts. If the summation for example from an accelerator depression amount of 1 to 0.5 exceeds 50%, the threshold values T0,SOC0 in FIG. 17 are modified to be larger.

The fineness and time of sampling may be freely set. Also, the threshold values T0,SOC0 were modified when the cumulative frequency exceeded a predetermined value, but the threshold values T0,SOC0 may be modified when the median value, highest frequency value or average value of the cumulative distribution exceeds a predetermined value, or they may be continuously modified according to these.

According to the fifth embodiment, the threshold values T0,SOC0 for selecting the operating mode of the power plant 10 are modified according to the vehicle running state, so both power generation responsiveness and fuel cost high performance efficiency can be obtained in various vehicle operating modes.

As an indicator of the vehicle running state, the vehicle weight W may be estimated based on a vehicle drive signal and vehicle speed signal, and the threshold values T0,SOC0 for selecting the operating mode of the power plant 10 modified according to the vehicle weight W so as to obtain power generation responsiveness and fuel cost-performance efficiency.

When the estimated vehicle weight W is larger than the predetermined value W0, or as the vehicle weight W increases, the threshold values T0,SOC0 are modified so that there are fewer occasions when the complete stop mode of the power plant 10 is selected, so when the vehicle weight W is large and a high responsiveness is required when power generation is resumed, there are fewer occasions when the power plant 10 enters the complete stop mode. Due to this, the temperature drop of the power plant 10 on standby can be suppressed, and a high power generation responsiveness can be ensured.

By estimating the type of road on which the vehicle is traveling based on the vehicle speed signal as an indicator of running state, both power generation responsiveness and fuel cost-performance efficiency can be obtained depending on the state of the road used by the vehicle.

When the average vehicle speed is high, it is estimated that the vehicle is traveling on an expressway, and in this case, the threshold values T0,SOC0 are modified so that there are fewer occasions when the power plant 10 enters the complete stop mode. Hence, when the vehicle is traveling on an expressway where a relatively high power is required, the power plant 10 enters the complete stop mode on fewer occasions, so temperature drop of the power plant 10 is suppressed and a high power generation responsiveness is ensured.

By estimating the type of vehicle stop based on the vehicle speed signal, brake signal and steering angle signal (or blinker state signal) as indicators of running state, the operating mode of the power plant 10 can be selected even during a vehicle stop when the power plant 10 tends to go on standby according to the type of vehicle stop, taking account of power generation responsiveness and fuel cost-performance.

When the vehicle speed is zero, the brake is depressed and the blinker is operating, the threshold values T0,SOC are modified so that there are fewer occasions when an operating mode which causes a complete stop of the power plant 10 is selected, so when a relatively high power generation responsiveness is required such as when waiting to turn right or left at an intersection or when starting a car from standstill, good responsiveness can be ensured by making it difficult for the power plant 10 to enter the complete stop mode.

By estimating the vehicle power state from the accelerator depression amount signal as an indicator of running state, an operating mode of the power plant 10 which takes account of both power generation responsiveness and fuel cost-performance efficiency can be selected according to a driver's acceleration operation.

The frequency of accelerator depression amount signals is statistically analyzed, and when the cumulative frequency in a predetermined region is larger than a predetermined rate, the threshold values T0,SOC0 are modified so that there are fewer occasions when an operating mode which causes a complete stop of the power plant 10 is selected. Hence, when the vehicle is traveling on an upward slope or on a congested road when the driver depresses the accelerator pedal by a relatively large amount on many occasions, it is made difficult for the power plant 10 to enter the complete stop mode so that a good responsiveness can be ensured.

Further, when the frequency of accelerator depression amount signals is statistically analyzed and the median value of the analysis results is more than a predetermined value, the maximum frequency of the analysis results is more than a predetermined value or the average value of the analysis results is more than a predetermined value, the threshold values T0,SOC0 are respectively modified so that there are fewer occasions when the complete stop mode is selected. Hence, when the vehicle is traveling on an upward slope or on a congested road when the median value, maximum frequency and average value of the accelerator depression amount is relatively large, it is made difficult for the power plant 10 to enter the complete stop mode so that a good responsiveness can be ensured.

Embodiment 6

Figure 19:
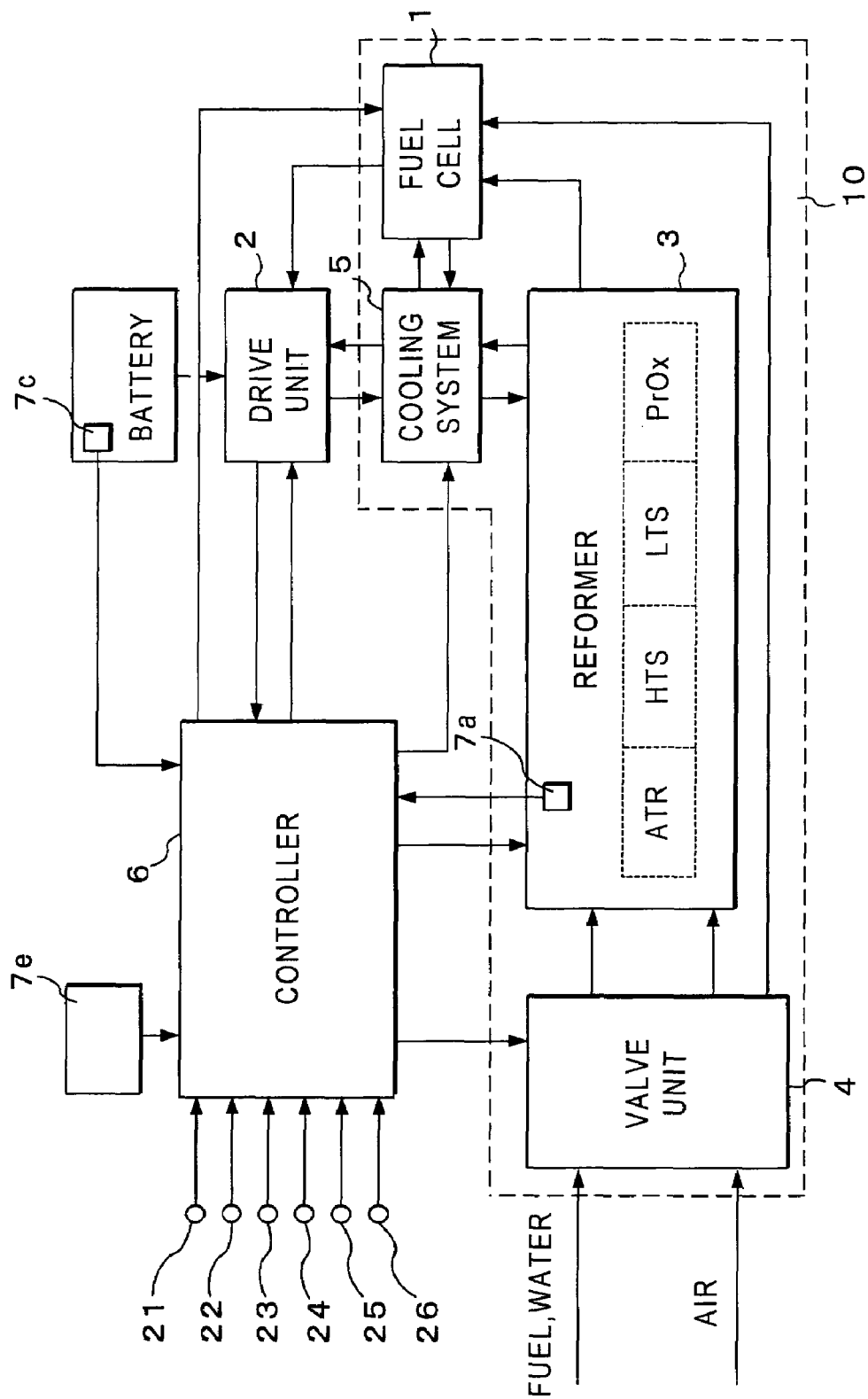
FIG. 19 is similar to FIG. 1, but showing the sixth embodiment.

The sixth embodiment will now be described referring to FIG. 19, FIG. 20.

According to the sixth embodiment, the vehicle running state is estimated based on information from a car navigation system, and the threshold values T0,SOC0 used to select the operating mode of the power plant 10 are modified. As shown in FIG. 19, a signal from a car navigation system 7e which receives information about the vehicle's position from satellites, is input to the controller 6.

Figure 20:
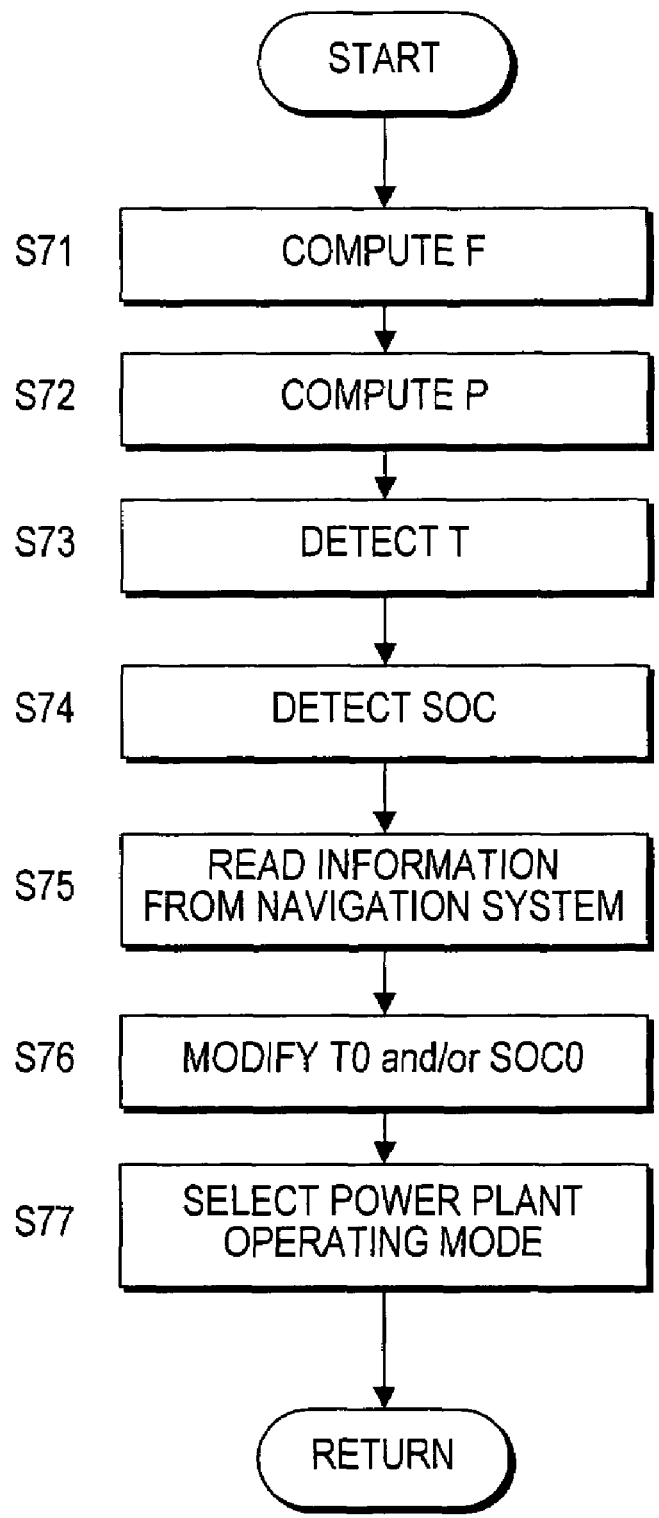
FIG. 20 is a flowchart showing a power plant operating mode selection process.

FIG. 20 is a flowchart showing a process for selecting the operating mode of the power plant 10, and is performed by the controller 6 at a predetermined interval, e.g., ten milliseconds.

In steps S71-S74, the vehicle drive force F and required power P are computed, and the reformer temperature T and battery SOC are read.

In a step S75, information from the car navigation system 7e is read, and the vehicle running state is determined. When, for example, it is determined that the vehicle is traveling on an expressway, it may be assumed that relatively higher power is required than when traveling in an urban area, so to enhance the responsiveness of the power plant 10, in a step S76, the threshold values T0,SOC0 are modified to be larger.

In a step S77, it is determined whether to run the power plant 10 or put it on standby based on the vehicle running state, and when the power plant 10 is put on standby, one of the complete stop mode, heat generation/dissipation balance mode and power generation/consumption balance mode is selected as the operating mode of the power plant 10 based on the running state of the power plant 10. If the threshold values T0,SOC0 are modified to be larger in the step S76, the power plant 10 does not easily shift to the complete stop mode, the temperature of the power plant 10 is maintained high, and good responsiveness when there is a power demand can be ensured.

Regarding determination of the vehicle running state and modifications of threshold values, and notwithstanding the above, if it is detected that the vehicle is approaching a tollgate in order to exit the expressway, the threshold values T0,SOC0 may be modified to be smaller in order to make it easier for the power plant 10 to enter the complete stop mode. Alternatively, if it is detected that the vehicle is approaching a tollgate in order to enter the expressway from an urban area, the threshold values T0,SOC0 are modified to be larger in order to adapt to running on the expressway, and make it difficult for the power plant 10 to enter the complete stop mode.

This control may be performed by predicting the time when high power is required of the power plant 10, or the time when the power plant 10 is leaving a high power requirement region and entering a region where not so much power is required, based on information from the car navigation system 7e and the average vehicle speed at that time while the vehicle is traveling, and modifying the threshold values T0,SOC0 when the time until this estimated time is shorter than a predetermined value.

In addition, the threshold values may also be modified based on information from the car navigation system 7e as follows.

Even when the vehicle is traveling on an expressway, the threshold values T0,SOC0 are modified to be smaller when a high responsiveness is not required of the power plant 10, such as in sections where there is no interchange, junction or parking area, or when the route can be predicted by routing information from the car navigation system and a long downward slope continues, so that the power plant 10 easily enters the complete stop mode. Conversely, if a long upward slope is approaching, the probability that a high responsiveness will be required is high, so the threshold values T0,SOC0 are modified to be larger.

Further, when it is detected that the vehicle is traveling through a mountainous region with many ups and downs, even on a local road (open road), the threshold values T0,SOC0 are modified to be larger to make it more difficult for the power plant 10 to enter the complete stop mode.

The information from the car navigation system 7e which is used is not limited to the road type or topography, and for example, if road congestion information is available, the threshold values T0,SOC0 are modified to be smaller so as to make it easier for the power plant 10 to enter the complete stop mode in a congested section. When the vehicle is approaching the end of a congested section, the threshold values T0,SOC0 are modified to be larger so as to make it more difficult for the power plant 10 to enter the complete stop mode.

When the vehicle is traveling on an expressway and is approaching the end of a congested section, an even higher responsiveness is required of the power plant 10 than when it has left a congested section on a local road, so the threshold values T0,SOC0 are modified to be larger to by making it still more difficult for the power plant 10 to enter the complete stop mode.

Instead of the car navigation system 7e or in addition to the car navigation system 7e, an ITS (Intelligent Transport System) device which makes use of road infrastructure information and realtime information can also be used.

The sixth embodiment has the following effects.

By estimating the vehicle running state from road topography information and/or traffic information from the car navigation system 7e, the operating mode of the power plant 10 can be selected taking account of both power generation responsiveness and fuel cost-performance efficiency according to the vehicle's actual travel state.

The time at which high power is required of the power plant 10 is predicted from road topography information and/or traffic information, and when the time until this predicted time is less than a predetermined value, the threshold values T0,SOC0 are modified so that there are fewer occasions when the complete stop mode is selected. In this way, for example, when it is estimated that the vehicle is about to begin traveling on an upward slope, or is leaving a congested area so that it is free to accelerate, there is less tendency for the power plant 10 to come to a complete stop leading to a temperature drop, so power generation responsiveness can be maintained and fuel cost-performance improved.

Embodiment 7

The seventh embodiment will now be described referring to FIG. 21 to FIG. 24.

In the seventh embodiment, as in the case of the sixth embodiment, the threshold values T0,SOC0 used for changing over the operating mode of the power plant 10 are modified based on information from the car navigation system 7e, and by making it possible to update a prestored initial threshold value, control is possible with a good responsiveness from when the vehicle begins traveling.

Figure 21:
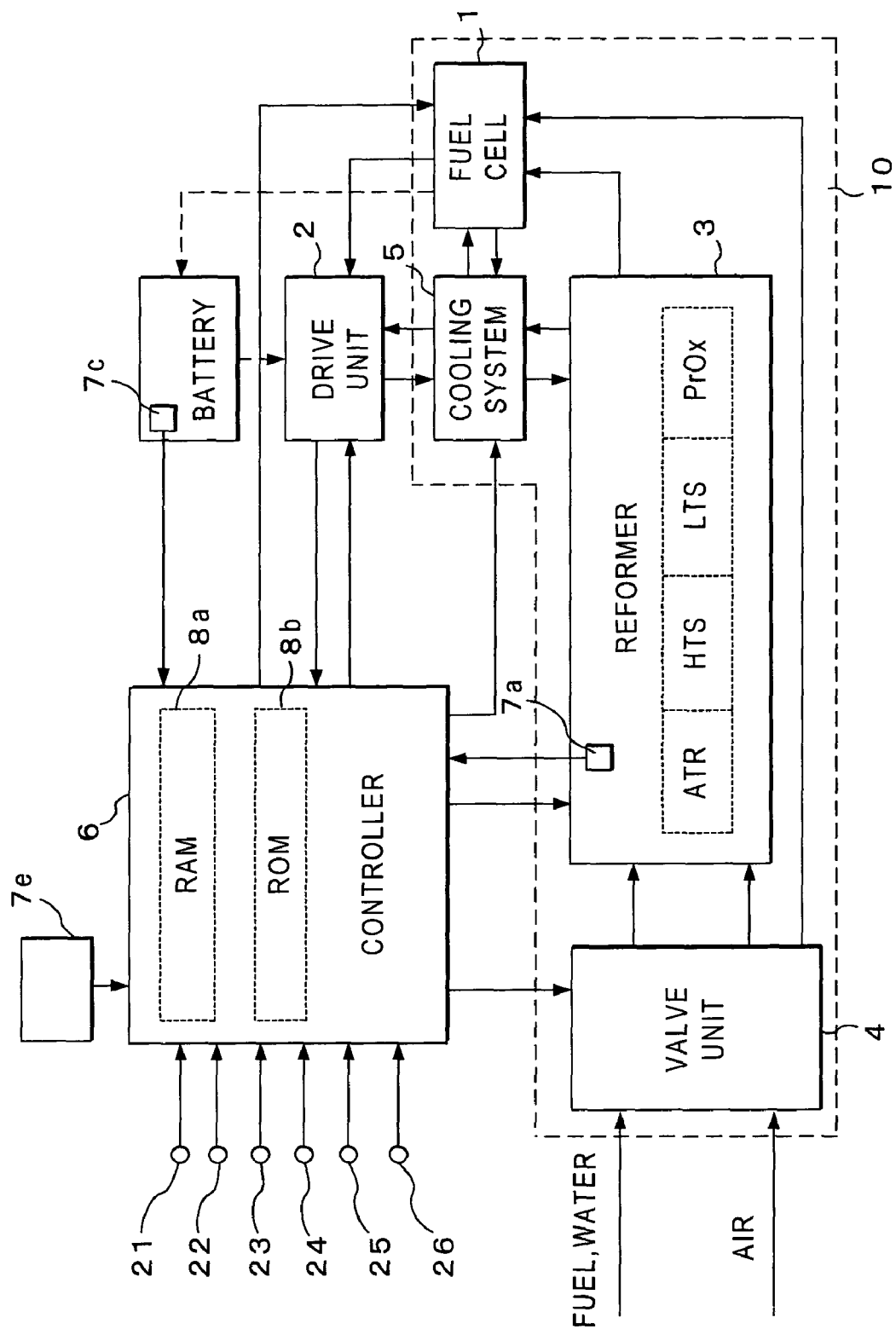
FIG. 21 is similar to FIG. 1, but showing the seventh embodiment.

For this purpose, as shown in FIG. 21, the controller 6 comprises a rewritable memory (RAM) 8a and a read-only memory (ROM) 8b. The remaining features of the construction are identical to those of FIG. 19, and their description is therefore omitted.

Figure 22:
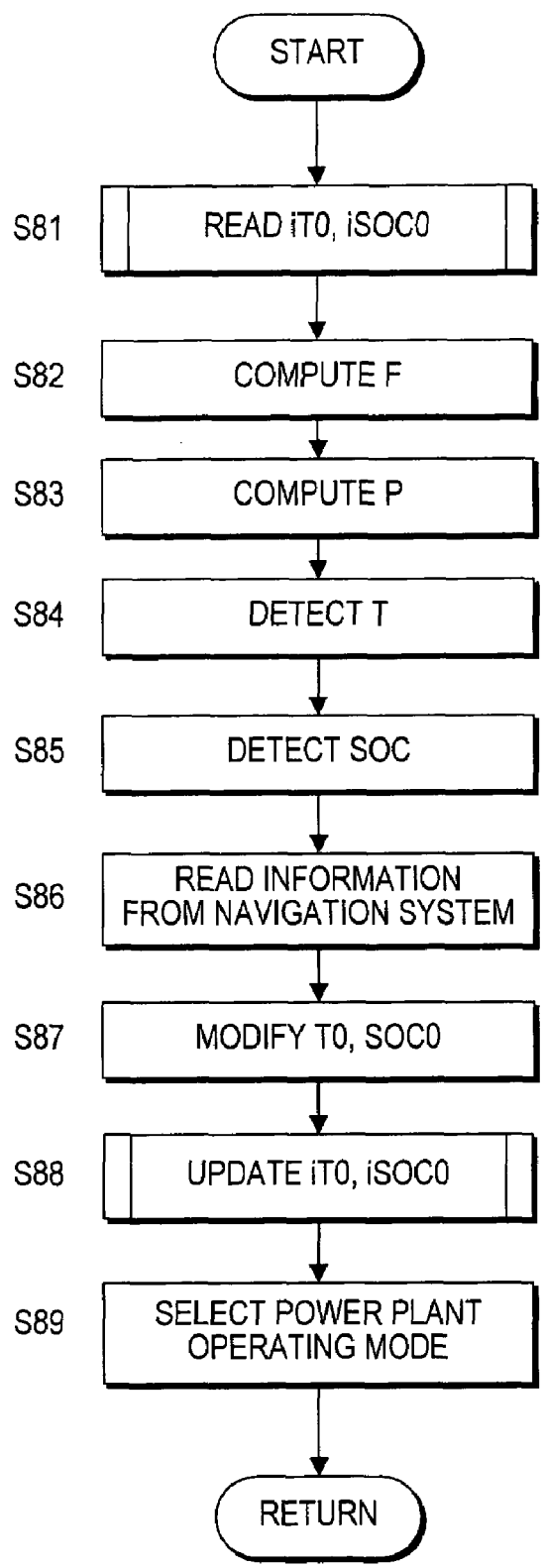
FIG. 22 is a flowchart showing a power plant operating mode selection process.

As shown by the flowchart of FIG. 22, the controller 6 modifies the threshold values and updates the initial threshold value based on information from the car navigation system 7e.

In a step S81, an initial threshold value iT0 of the reformer temperature and an initial threshold value iSOC0 of the battery SOC are read.

In steps S82-S87, as shown in FIG. 20, the vehicle running state is estimated, and the threshold values T0,SOC0 are modified based on the vehicle running state.

In a step S88, the initial threshold values iT0, iSOC0 are updated to the threshold values T0,SOC0 modified in the step S87.

In a step S89, the operating mode of the power plant 10 is selected according to the vehicle running state.

In the seventh embodiment, the reading of the initial threshold value in the step S81, and the updating of the initial threshold value in the step S88, are different from the sixth embodiment.

Figure 23:
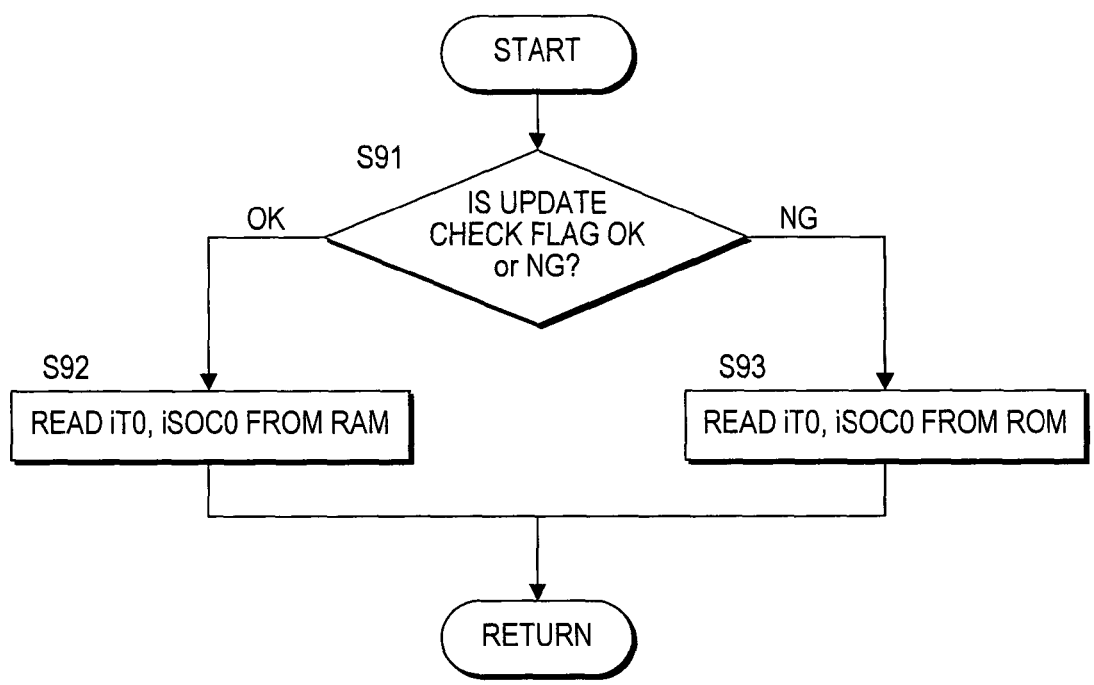
FIG. 23 is a flowchart showing an initial threshold read process.

FIG. 23 is a flowchart showing the initial threshold value read process, and is executed by the controller 6.

In a step S91, an update check flag of the RAM 8a is checked. If the update check flag is OK as described later, the routine proceeds to a step S92, and the initial threshold values iT0, iSOC0 are read from the RAM 8a. On the other hand, if the update check flag is NG, the initial threshold values iT0, iSOC0 are read from the ROM 8b.

Therefore, when the initial threshold values are read from the RAM 8a, the initial threshold values are updated to new values, and when they are read from the ROM 8b, they are the first threshold values.

Figure 24:
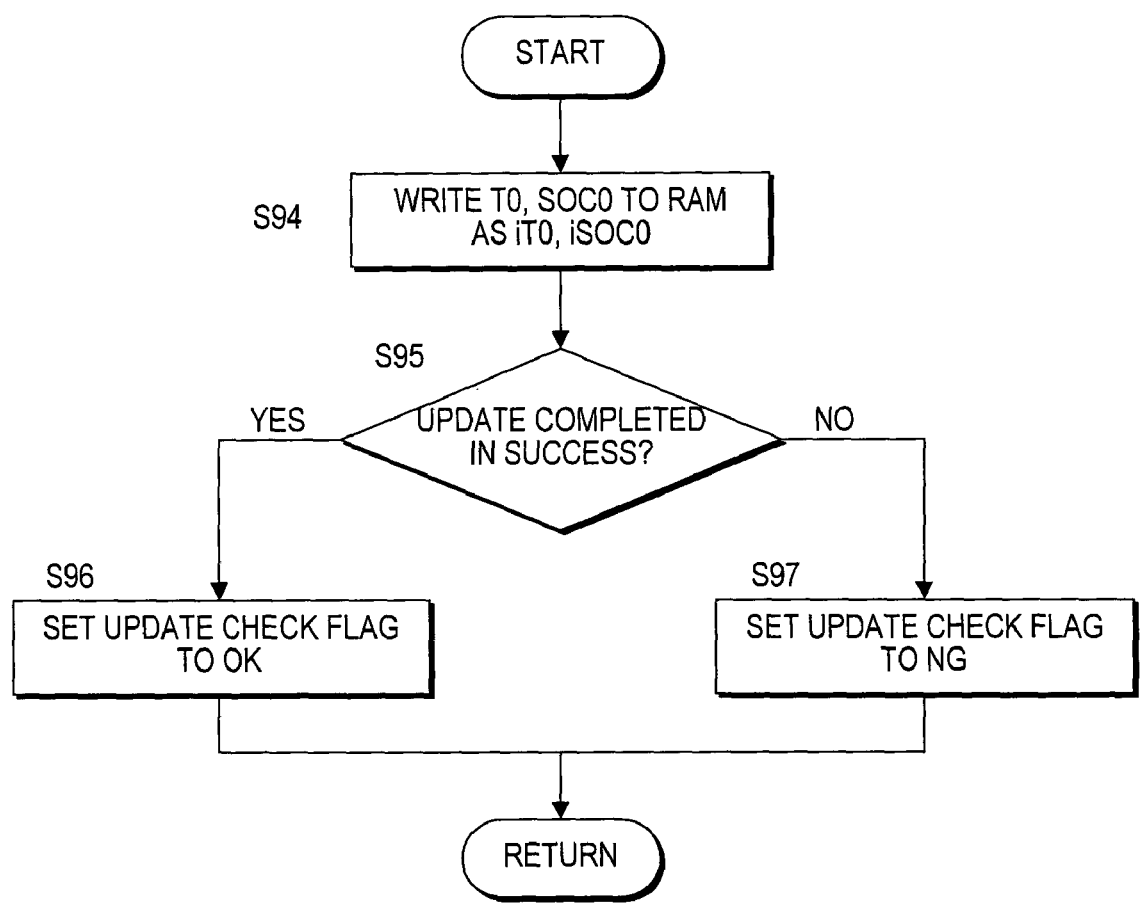
FIG. 24 is a flowchart showing an initial threshold change process.

FIG. 24 is a flowchart showing the process of modifying the initial threshold values, and is executed by the controller 6.

In a step S94, the threshold values modified in the step S87 are written to the RAM 8a as new initial threshold values iT0, iSOC0.

In a step S95, it is checked whether the updating of the RAM 8a has completed successfully, and if the write value and written value coincide, the update check flag is set to OK in a step S96, whereas if they do not coincide due to a memory fault, etc., the update check flag is set to NG in a step S97.

By successively updating the threshold values iT0, iSOC0 according to the running state of the vehicle, high responsiveness of the power plant 10 according to the running state is ensured from when the vehicle begins traveling.

For example, as described above, when the vehicle is traveling through a mountainous area where there are steep upward and downward slopes, or traveling through an urban area with intermittent congestion, high responsiveness is required of the power plant 10 when power generation is required, and as the initial threshold value recorded in the RAM 8a is updated to a value compatible with high responsiveness, the initial threshold value is suitable from when the vehicle begins traveling and high responsiveness is ensured.

The RAM 8a may be updated by writing the threshold value after modification, or writing the sum of the product of multiplying the difference between the value presently recorded in the RAM 8a and the threshold value after modification in the step S88 by a predetermined coefficient and the value presently recorded in the RAM 8a, in the RAM 8a. For example, if the value presently recorded is $iT0_n$, the value after updating is $iT0_{n+1}$ and the value after modification is $T0_n$, the threshold value is modified by:

$$iT0_{n+1} = iT0_n + a \times (T0_n - iT0_n)$$

The coefficient a may for example be set to a value of the order of 0.001-0.5. If the coefficient a is set large, the result of updating the threshold value is rapidly reflected in the initial threshold value, and if it is set small, the result of updating the threshold value is gradually reflected in the initial threshold value.

In the case of the fifth to seventh embodiments, the threshold values which are modified are the reformer temperature threshold value T0 and battery charge state threshold value SOC0, but if a running/stopping time counter is provided for the power plant 10 as in the fourth embodiment, a threshold value of the running time/stopping time may also be modified. In this case, the immediately preceding stopping time threshold value may be increased, or immediately preceding running time threshold value may be increased, which corresponds to making the power plant 10 enter the complete stop mode more easily.

The seventh embodiment has the following effects.

Regarding the threshold values for selecting the operating mode of the power plant 10, an initial value storage region which cannot be modified and an initial value storage region which can be updated are provided, so updating can be performed according to the usage environment of the vehicle, and an operating mode of the power plant 10 which satisfies both high responsiveness and efficient fuel cost-performance can be selected.

The initial threshold value stored in the rewritable storage region is updated according to a modification of the threshold value for selecting the operating mode of the power plant 10, and the operating mode of the power plant 10 is selected based on this updated initial value. Therefore, for vehicles which have a running history, the updated threshold value based on the previous travel history is used without the threshold value in operation mode selection processing returning to the initial value each time the driver starts the vehicle, so the optimum operating mode which permits rapid compliance with the running state expected for the vehicle is selected, and both power generation responsiveness and efficient fuel cost-performance can be achieved.

This invention is not limited to the aforesaid embodiments, it being understood that various modifications can be made within the scope and spirit of the appended claims. For example, the fuel supply device used a hydrocarbon fuel, and a hydrogen-rich gas was generated by the reformer, but hydrogen may also be generated from decalin or sodium hydrogen borate, and hydrogen may also be extracted from a hydrogen occlusion alloy or high-pressure tank.

Also, the threshold values of the immediately preceding running time, immediately preceding stopping time, battery charge state, reformer temperature and accelerator depression amount given in FIG. 8, FIG. 11, FIG. 14, FIG. 17 and FIG. 19 are not limited thereto, and may be appropriately set depending on the construction and specification of the moving body fuel cell power plant system.

The entire contents of Japanese Patent Application P2002-261347 (filed September, 2002) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A control method for a fuel cell power plant system for a moving body, the system including a drive device which drives the moving body by receiving power, and a power plant having a fuel cell supplying power to the drive device and a fuel supply device which supplies fuel required for the fuel cell to generate power to the fuel cell, the method comprising:
   when the moving body has stopped, selecting one operating mode from plural operating modes according to a running state of the power plant, the fuel cell not generating power to be supplied to the drive device in the plural operating modes;
   controlling the power plant based on the selected operating mode;
   counting running time and stopping time of the power plant; and
   selecting one operating mode from the plural operating modes based on the running time before the power plant enters a standby state, and the stopping time after the power plant enters the standby state.

2. The control method as defined in claim 1, further comprising:
   selecting a complete stop mode which completely stops power generation by the power plant as the operating mode of the power plant, the longer is the running time before the power plant enters the standby state, and the shorter is the time after the power plant enters the standby state.

3. The control method as defined in claim 1, further comprising:
   selecting a heat generation/dissipation balance mode which causes the power plant to generate power so as to maintain a temperature at which the power plant can maintain an active state, as the operating mode of the power plant, the shorter is the running time before the power plant enters the standby state, and the longer is the time after the power plant enters the standby state.

4. A control method for a fuel cell power plant system for a moving body, the system including a drive device which drives the moving body by receiving power, and a power plant having a fuel cell supplying power to the drive device and a fuel supply device which supplies fuel required for the fuel cell to generate power to the fuel cell, the method comprising:
   when the moving body has stopped, selecting one operating mode from plural operating modes according to a running state of the power plant, the fuel cell not generating power to be supplied to the drive device in the plural operating modes;
   controlling the power plant based on the selected operating mode;
   detecting a temperature of the power plant;
   selecting one operating mode from the plural operating modes based on the temperature of the power plant;
   detecting a charge state of a battery, the battery being charged by the power generation of the fuel cell and supplying power to the drive device;
   selecting one operating mode from the plural operating modes based on the charge state of the battery and the temperature of the power plant;
   selecting a power generation/consumption balance mode which causes the power plant to generate power according to a power consumption of electronic parts including the controller as the operating mode of the power plant regardless of the temperature of the power plant, when the charge state of the battery is less than a predetermined charge state threshold;
   selecting a heat generation/dissipation balance mode so that a temperature is maintained at which the power plant can maintain an active state as the operating mode of the power plant, when the charge state of the battery is more than the predetermined charge state threshold, and the temperature of the power plant is less than a predetermined temperature threshold; and
   selecting a complete stop mode which causes the power plant to completely stop generating power as the operating mode of the power plant, when the charge state of the battery is more than the predetermined charge state threshold, and the temperature of the power plant is higher than the predetermined temperature threshold.

5. The control method as defined in claim 4 further comprising:
   detecting a temperature of the fuel supply device as the temperature of the power plant.

6. The control method as defined in claim 4, further comprising:
   modifying the threshold value for selecting the operating mode of the power plant according to a running state of the moving body.

7. The control method as defined in claim 6, further comprising:
   detecting a displacement speed of the moving body;
   detecting a load of the moving body; and
   estimating a weight of the moving body based on the displacement speed and load of the moving body.

8. The control method as defined in claim 7, further comprising:
   modifying the threshold used for selecting the operating mode of the power plant so that there are fewer occasions when a complete stop mode which causes the power plant to stop generating power completely is selected as the operating mode of the power plant, when the estimated weight of the moving body is more than a predetermined weight threshold.

9. The control method as defined in claim 7, further comprising:
   modifying the threshold used for selecting the operating mode of the power plant so that there are fewer occasions when a complete stop mode which causes the power plant to stop generating power completely is selected as the operating mode of the power plant, as the estimated weight of the moving body increases.

10. The control method as defined in claim 6, further comprising:
    detecting a displacement speed of the moving body; and
    estimating a type of road on which the moving body is traveling based on the displacement speed of the moving body.

11. The control method as defined in claim 10, further comprising:
   estimating that the moving body is traveling on an expressway when an average value of the displacement speed is high; and
   when it is estimated that the moving body is traveling on the expressway, modifying the threshold used for selecting the operating mode of the power plant so that there are fewer occasions when a complete stop mode which causes the power plant to stop generating power completely is selected as the operating mode of the power plant.

12. The control method as defined in claim 6, further comprising:
   detecting a displacement speed of the moving body;
   detecting a braking state of the moving body;
   detecting a blinker state of the moving body; and
   estimating the state when the moving body has stopped based on the displacement speed, braking state and blinker state of the moving body.

13. The control method as defined in claim 12, further comprising:
   modifying the threshold used for selecting the operating mode of the power plant so that there are fewer occasions when a complete stop mode which causes the power plant to stop generating power completely is selected as the operating mode of the power plant, when the displacement speed is zero, braking is performed and a blinker is operating.

14. The control method as defined in claim 6, further comprising:
   detecting a load of the moving body; and
   estimating a power of the moving body from the load of the moving body.

15. The control method as defined in claim 14, further comprising:
   statistically analyzing the load of the moving body, and when a cumulative frequency of a predetermined region exceeds a predetermined rate, modifying the threshold used for selecting the operating mode of the power plant so that there are fewer occasions when a complete stop mode which causes the power plant to stop generating power completely is selected as the operating mode of the power plant.

16. The control method as defined in claim 14, further comprising: statistically analyzing the load of the moving body, and when a median value of the load exceeds a predetermined value, modifying the threshold used for selecting the operating mode of the power plant so that there are fewer occasions when a complete stop mode which causes the power plant to stop generating power completely is selected as the operating mode of the power plant.

17. The control method as defined in claim 14, further comprising:
   statistically analyzing the load of the moving body, and when a most frequent value of the load exceeds a predetermined value, modifying the threshold used for selecting the operating mode of the power plant so that there are fewer occasions when a complete stop mode which causes the power plant to stop generating power completely is selected as the operating mode of the power plant.

18. The control method as defined in claim 14, further comprising:
   statistically analyzing the frequency of the load, and when an average value of the load exceeds a predetermined value, modifying the threshold used for selecting the operating mode of the power plant so that there are fewer occasions when a complete stop mode which causes the power plant to stop generating power completely is selected as the operating mode of the power plant.

19. The control method as defined in claim 6, further comprising:
   predicting a time when high power of the power plant will be required from information from a navigation system, the navigation system receiving position information about the moving body; and
   when the time until the predicted time is less than a predetermined time, modifying the threshold used for selecting the operating mode of the power plant so that there are fewer occasions when a complete stop mode which causes the power plant to stop generating power completely is selected as the operating mode of the power plant.

20. The control method as defined in claim 6, further comprising:
   storing the threshold used for selecting the operating mode of the power plant in a rewritable memory.

21. The control method as defined in claim 20, further comprising:
   updating the value stored in the rewritable memory when the threshold used for selecting the operating mode of the power plant is modified, and subsequently selecting the operating mode of the power plant using the updated value.

22. A control method for a fuel cell power plant system for a moving body, the system including a drive device which drives the moving body by receiving power, and a power plant having a fuel cell supplying power to the drive device and a fuel supply device which supplies fuel required for the fuel cell to generate power to the fuel cell, the method comprising:
   when the moving body has stopped, selecting one operating mode from plural operating modes according to a running state of the power plant, the fuel cell not generating power to be supplied to the drive device in the plural operating modes;
   controlling the power plant based on the selected operating mode;
   detecting a charge state of a battery, the battery being charged by the power generation of the fuel cell and supplying power to the drive device;
   counting running time and stopping time of the power plant; and
   selecting one operating mode from the plural operating modes based on the charge state of the battery, the running time before the power plant enters a standby state and the stopping time after the power plant enters the standby state.

23. The control method as defined in claim 22, further comprising:
   selecting a power generation/consumption balance mode which causes the power plant to generate power according to a power consumption of electronic parts including the controller as the operating mode of the power plant regardless of the running time before the power plant enters the standby state, when the charge state of the battery is less than a predetermined charge state threshold; and
   when the charge state of the battery is more than the predetermined charge state threshold, tending to select a complete stop mode which causes the power plant to completely stop generating power as the operating mode of the power plant, the longer is the running time before the power plant enters the standby state, or the shorter is the stopping time after the power plant enters the standby state, and tending to select a heat generation/dissipation balance mode so that a temperature is maintained at which the power plant can maintain an active state as the operating mode of the power plant, the shorter is the running time before the power plant enters the standby state, or the longer is the stopping time after the power plant enters the standby state.

* * * * *